(12) United States Patent
North

(10) Patent No.: US 9,994,924 B2
(45) Date of Patent: *Jun. 12, 2018

(54) METHOD FOR THE FRACTIONATION OF LIGNOCELLULOSIC BIOMASS

(71) Applicant: Nova Pangaea Technologies Limited, Cloyne, County Cork (IE)

(72) Inventor: Peter Herbert North, Cork (IE)

(73) Assignee: NOVA PANGAEA TECHNOLOGIES LIMITED, Cloyne, County Cork (IE)

( * ) Notice: Subject to any disclaimer, the term of this patent is extended or adjusted under 35 U.S.C. 154(b) by 164 days.

This patent is subject to a terminal disclaimer.

(21) Appl. No.: 14/940,661

(22) Filed: Nov. 13, 2015

(65) Prior Publication Data

US 2016/0068920 A1 Mar. 10, 2016

Related U.S. Application Data

(63) Continuation of application No. 14/151,231, filed on Jan. 9, 2014, now Pat. No. 9,200,336, which is a continuation of application No. 12/893,429, filed on Sep. 29, 2010, now Pat. No. 8,657,960.

(60) Provisional application No. 61/246,721, filed on Sep. 29, 2009.

(51) Int. Cl.
C13K 1/02 (2006.01)
C13K 13/00 (2006.01)
C08H 8/00 (2010.01)

(52) U.S. Cl.
CPC ............... *C13K 1/02* (2013.01); *C08H 8/00* (2013.01); *C13K 13/00* (2013.01)

(58) Field of Classification Search
CPC ............ C08H 8/00; C13K 1/02; C13K 13/00
See application file for complete search history.

(56) References Cited

U.S. PATENT DOCUMENTS

| 3,787,241 A | 1/1974 | Eickemeyer |
| 4,363,264 A | 12/1982 | Lang et al. |
| 4,461,648 A | 7/1984 | Foody |
| 4,520,105 A | 5/1985 | Sinner et al. |
| 4,673,460 A | 6/1987 | Raff |
| 4,708,746 A | 11/1987 | Hinger |
| 4,880,473 A | 11/1989 | Scott et al. |
| 4,891,459 A | 1/1990 | Knight et al. |
| 4,897,497 A | 1/1990 | Fitzpatrick |
| 4,908,067 A | 3/1990 | Just |
| 4,950,751 A | 8/1990 | Dewitt |
| 5,171,592 A | 12/1992 | Holtzapple et al. |
| 5,328,562 A | 7/1994 | Rafferty et al. |
| 5,411,594 A | 5/1995 | Brelsford |
| 5,454,911 A | 10/1995 | Rafferty et al. |
| 5,503,996 A | 4/1996 | Torget et al. |
| 5,536,325 A | 7/1996 | Brink et al. |
| 5,605,551 A | 2/1997 | Scott et al. |
| 5,698,667 A | 12/1997 | Speaks et al. |
| 5,728,271 A | 3/1998 | Piskorz et al. |
| 5,769,934 A | 6/1998 | Ha |
| 5,876,505 A | 3/1999 | Klyosov et al. |
| 5,961,786 A | 10/1999 | Freel et al. |
| 6,022,419 A | 2/2000 | Torget et al. |
| 6,419,788 B1 | 7/2002 | Wingerson |
| 6,555,350 B2 | 4/2003 | Ahring et al. |
| 6,620,292 B2 | 9/2003 | Wingerson |
| 6,653,517 B2 | 11/2003 | Bullock |
| 6,660,506 B2 | 12/2003 | Nguyen et al. |
| 6,770,168 B1 | 8/2004 | Stigsson et al. |
| 7,108,767 B2 | 9/2006 | Noto |
| 7,109,005 B2 | 9/2006 | Eroma et al. |
| 7,198,695 B2 | 4/2007 | Kettenbach et al. |
| 7,465,791 B1 | 12/2008 | Hallberg et al. |
| 7,507,341 B2 | 3/2009 | Gallagher et al. |
| 7,625,728 B2 | 12/2009 | Eroma et al. |

(Continued)

FOREIGN PATENT DOCUMENTS

| EP | 1316620 A2 | 6/2003 |
| EP | 2483331 A2 | 8/2012 |

(Continued)

OTHER PUBLICATIONS

Aliyu, M. et al., "Effects of ultrasound energy on degradation of cellulose material," Ultrasonics Sonochemistry, (Oct. 1, 2000), pp. 265-268, vol. 7, No. 4, Butterworth-Heinermann, Great Britain.

Amidon, Thomas E., et al., "Water-based woody biorefinery," Biotechnology Advances, (Sep. 1, 2009), pp. 542-550, vol. 27, No. 5.

Diebold, James P., "A unified, global model for the pyrolysis of cellulose," Biomass and Bioenergy, (Jan. 1, 1994), pp. 75-85, vol. 7, No. 1-6, Pergamon, Oxford, Great Britain.

(Continued)

*Primary Examiner* — David A Reifsnyder

(74) *Attorney, Agent, or Firm* — Fredrikson & Byron, P.A.

(57) ABSTRACT

Methods and systems for fractionating lignocellulosic biomass including hemicellulose, cellulose and lignin, including exploding the biomass cells to devolatilize the biomass, hydrolyzing the hemicellulose to produce a liquid component including hemicellulosic sugars and a solid component including less than 10% hemicellulose, separating the liquid and solid components, vaporizing the cellulose in the solid component, and condensing the cellulosic sugar vapors. The methods and systems may vaporize the cellulose in a continuous steam reactor at a temperature of about 400-550° C. and a pressure of about 1-3 bara. Electromagnetic and/or electroacoustic treatment such as ultrasound and/or microwave treatment may be applied to the biomass immediately before or during cellulose hydrolysis.

19 Claims, 10 Drawing Sheets

(56) References Cited

U.S. PATENT DOCUMENTS

| | | | |
|---|---|---|---|
| 7,666,637 | B2 | 2/2010 | Nguyen |
| 7,824,521 | B2 | 11/2010 | Van Heiningen et al. |
| 7,901,511 | B2 | 3/2011 | Griffin et al. |
| 8,337,663 | B2 | 12/2012 | Xu et al. |
| 8,657,960 | B2 | 2/2014 | North |
| 9,200,336 | B2 * | 12/2015 | North ............... C08H 8/00 |
| 2005/0161038 | A1 | 7/2005 | Pinatti et al. |
| 2007/0254348 | A1 | 11/2007 | Retsina et al. |
| 2008/0227161 | A1 | 9/2008 | Levie et al. |
| 2008/0295980 | A1 | 12/2008 | Hallberg et al. |
| 2009/0035198 | A1 | 2/2009 | Fecteau et al. |
| 2009/0062516 | A1 | 3/2009 | Belanger et al. |
| 2009/0082604 | A1 | 3/2009 | Agrawal et al. |
| 2009/0084666 | A1 | 4/2009 | Agrawal et al. |
| 2009/0090046 | A1 | 4/2009 | O'Connor et al. |
| 2009/0098616 | A1 | 4/2009 | Burke et al. |
| 2009/0098617 | A1 | 4/2009 | Burke et al. |
| 2009/0117226 | A1 | 5/2009 | Hallberg et al. |
| 2009/0118477 | A1 | 5/2009 | Hallberg et al. |
| 2009/0165378 | A1 | 7/2009 | Agblevor |
| 2009/0221814 | A1 | 9/2009 | Pschorn et al. |
| 2009/0299628 | A1 | 12/2009 | Canis |
| 2009/0308383 | A1 | 12/2009 | Shin et al. |
| 2010/0003548 | A1 | 1/2010 | Hall |
| 2010/0105970 | A1 | 4/2010 | Yanik et al. |
| 2010/0136642 | A1 | 6/2010 | Belanger et al. |
| 2010/0209965 | A1 | 8/2010 | O'Connor et al. |
| 2010/0261895 | A1 | 10/2010 | Noll et al. |
| 2010/0269990 | A1 | 10/2010 | Dottori et al. |
| 2010/0279361 | A1 | 11/2010 | South et al. |
| 2010/0285534 | A1 | 11/2010 | South et al. |
| 2010/0287826 | A1 | 11/2010 | Hoffman et al. |
| 2010/0313882 | A1 | 12/2010 | Dottori et al. |
| 2011/0020873 | A1 | 1/2011 | Ren et al. |
| 2011/0100359 | A1 | 5/2011 | North |
| 2011/0129886 | A1 | 6/2011 | Howard et al. |
| 2011/0129888 | A1 | 6/2011 | Van Zyl et al. |
| 2011/0143411 | A1 | 6/2011 | Yuan et al. |

FOREIGN PATENT DOCUMENTS

| | | | |
|---|---|---|---|
| WO | 9509722 | A1 | 4/1995 |
| WO | 2006034590 | A1 | 4/2006 |
| WO | 2008137639 | A1 | 11/2008 |
| WO | 2009015614 | A1 | 2/2009 |
| WO | 2009018469 | A1 | 2/2009 |
| WO | 2009058276 | A1 | 5/2009 |
| WO | 2009108773 | A2 | 9/2009 |
| WO | 2009116070 | A2 | 9/2009 |
| WO | 2010030689 | A1 | 3/2010 |
| WO | 2010113129 | A2 | 10/2010 |
| WO | 2010151536 | A1 | 12/2010 |
| WO | 2011007369 | A1 | 1/2011 |
| WO | 2011043935 | A1 | 4/2011 |
| WO | 2011057413 | A1 | 5/2011 |

OTHER PUBLICATIONS

Gonzales J., et al., "Production of antioxidants from Eucalyptus globulos wood by solvent extraction of hemicellulose hydrolysates," Food Chemistry, (Feb. 1, 2004), pp. 243-251, vol. 84, No. 2.

Huang, Hua-Jiang, et al., "A review of separation technologies in current and future biorefineries," Separation and Purification Technology, (Aug. 1, 2008 ), pp. 1-21, vol. 62, No. 1.

Lapuerta, Magin, et al., "Kinetics of devolatilisation of forestry wastes from thermogravimetric analysis," Biomass and Bioenergy, (Oct. 1, 2004), pp. 385-391, vol. 27, No. 4.

Gronli et al., "Thermogravimetric Analysis and Devlolatilization Kinetics of Wood," Industrial & Engineering Chemistry Research, vol. 41, No. 17, (Aug. 1, 2002), pp. 4201-4208 D& Engineering Chemistry Research, (Aug. 1, 2002), pp. 4201-4208, vol. 41, No. 17.

Sagehashi, Masaki, et al., "Superheated steam pyrolysis of biomass elemental components and Sugi (Japanese cedar) for fuels and chemicals," Bioresource Technology, Elsevier BV, (Jan. 7, 2006), pp. 1272-1283, vol. 97, No. 11, Great Britain.

International Search Report dated Jul. 13, 2011 for PCT/IB2010/002591, 2 pg.

Written Opinion dated Jul. 13, 2011 for PCT/IB2010/002591, 5 pg.

Balat et al., "Main routes for the thermo-conversion of biomass into fuels and chemicals. Part 1: Pyrolysis systems," Energy Conversion and Management, vol. 50, 2009, pp. 3147-3157.

Belghiti et al., "Mass transfer of sugar from beets enhanced by pulsed electric field," Food and Biproducts Processing, vol. 82, No. C3, 2004, pp. 226-230.

BioTherm a System for Continuous Quality, Fast Pyrolysis BioOil, Presentation by DynaMotive Energy Systems corporation at the Fourth Biomass Conference of the Americas, Sep. 1, 1999, 11 pages.

Bridgwater et al., "An overview of fast pyrolysis of biomass," Organic Geochemistry, vol. 30, 1999, pp. 1479-1493.

Corrales et al., "Extraction of anthocyanins from grape by-products assisted by ultrasonics, high hydrostatic pressure or pulsed electric fields: A comparision," Innovative Food Science and Engineering Technologies, vol. 9, 2008, pp. 85-91.

Da Costa Sousa et al., "'Cradle-to-grave' assessment of existing lignocellulose pretreatment technologies," Current Opinion in Biotechnology, vol. 20, 2009, pp. 339-347.

Demirbas, "Biorefineries: Current activities and future developments," Energy Conversion and Management, vol. 50, 2009, pp. 2782-2801.

European Patent Application No. 10784571.1, Communication Pursuant to Article 94(3) EPC dated Sep. 15, 2014, 3 pages.

Fitzpatrick et al., "A biorefinery processing perspective: Treatment of lignocellulosic materials for the production of value-added products," Bioresource Technology, vol. 101, 2010, pp. 8915-8922.

Goudriaan et al., "Thermal efficiency of the HTU process for biomass liquefaction," presented at Progress in Thermochemical Biomass Conversion conference, Sep. 18-21, 2000, pp. 1312-1325.

Gravitis et al., "Clustering of bio-products technologies for zero emissions and eco-efficiency," Industrial Crops and Products, vol. 20, 2004, pp. 169-180.

Guffey et al., "Fractionation of Lignuocellulosic Biomass for Fuel-Grade Ethanol Production," Western Research Institute for US Department of Energy, WRI-02-R019, Oct. 2002, 24 pages.

Zhang et al., "Microwave-assisted conversion of lignocellulosic biomass into furans in ionic liquid," Bioresource Technology, vol. 101, 2010, pp. 1111-1114.

Hamelinck et al., "Ethanol from lignocellulosic biomass: techno-economic performance in short-, middle- and long-term," Biomass and Bioenergy, vol. 28, 2005, pp. 384-410.

Hu et al., "Feedstock Pretreatment Strategies for Producing Ethanol from Wood, Bark, and Forest Residues," BioResources, vol. 3, No. 1, 2008, pp. 270-294.

Kimbaris et al., "Comparison of distillation and ultrasound-assisted extraction methods for the isolation of sensitive aroma compounds from garlic (*Allium sativum*)," Ultrasonics Sonochemistry, vol. 13, 2006, pp. 54-60.

Lehrburger, "Developing an Advanced Cellulosic Biorefining Technology," PureVision Technology, Inc., Harvesting Clean Energy Conference, Jan. 29, 2007, 10 pages.

Lipinsky et al., "Enhanced Wood Fuels via Torrefaction," Fuel Chemistry Division Preprints, vol. 47, No. 1, 2002, 3 pages.

Lundqvist et al., "Characterization of galactoglucomannan extracted from spruce (*Picea abies*) by heat-fractionation at different conditions," Carbohydrate Polymers, vol. 51, 2003, pp. 203.211.

PureVision's Cellulosic Biorefining Technology, "2009 Fuel Ethanol Workshop, Advanced Biofuels Workshop," PureVison Technology, Inc., Jun. 17, 2009, 13 pages.

Semen et al., "Production, Yield and Derivatives of Volatile Oils from Eastern Redcedar (*Juniperus virginiana* L.)" American Journal of Environmental Sciences, vol. 1, No. 2, 2005, pp. 133-138.

SunOpta BioProcess Inc. brochure "From Feedstock to Fuel—Here and Now," 2008, 29 pages.

(56) References Cited

OTHER PUBLICATIONS

Swanson et al., "Feed system innovation for gasification of locally economical alternative fuels (FIGLEAF)," Final Report prepared for AAD Document Control, US Department of Energy, Feb. 2003, 57 pages.

Taherzadeh et al., "Pretreatment of Lignocellulosic Wastes to Improve Ethanol and Biogas Production: A Review," International Journal of Molecular Sciences, vol. 9, 2008, pp. 1621-1651.

Venderbosch et al., "Fast pyrolysis technology development," Biofuels, Bioproducts & Biorefining, vol. 4, 2010, pp. 178-208.

Vinatoru, "An overview of the ultrasonically assisted extraction of bioactive principles from herbs," Ultrasonics Sonochemistry, vol. 8, 2001, pp. 303-313.

Wang et al., "Recent advances in extraction of nutraceuticals from plants," Trends in Food Science & Technology, vol. 17, 2006, pp. 300-312.

* cited by examiner

STAGE #1 (Alternative)

STAGE #3

STAGE #3 (Option)

C 5 Sugars Expression (Alternative)

METHOD FOR THE FRACTIONATION OF LIGNOCELLULOSIC BIOMASS

PRIORITY

This application claims priority to U.S. patent application Ser. No. 14/151,231, filed Jan. 9, 2014, which issued as U.S. Pat. No. 9,200,336 and which in turn claims priority to U.S. patent application Ser. No. 12/893,429, filed Sep. 29, 2010, which issued as U.S. Pat. No. 8,657,960 and which in turn claims priority to U.S. provisional patent application Ser. No. 61/246,721, filed Sep. 29, 2009, the disclosures of each of which are hereby incorporated by reference in their entirety.

BACKGROUND

It is now generally accepted that fossil fuels are both limited as a resource and cause a net increase in global emissions of carbon dioxide, a "greenhouse gas" implicated in a potential global warming scenario. These fossil fuels, in particular petroleum, are essential for the production of liquid transportation fuels and the vast majority of organic chemicals, in addition to providing a significant proportion of static energy generation.

The only significant alternative source for liquid transportation fuels and organic chemicals is biomass, such as lignocellulosic biomass, and considerable effort has been expended over many decades to produce efficient and economic processes for the conversion of biomass into such fuels and chemicals.

Lignocellulosic or woody biomass is largely composed of hemicellulose, cellulose and lignin. Sources of lignocellulosic biomass include wood and wood residues, agricultural waste such as corn stover, woody grasses, and residential and industrial waste. Each of the main components of lignocellulosic biomass is a valuable material. For example, cellulose is principally comprised of C6 sugars (glucose) which may be further processed for the production of ethanol, a commercial fuel, or recovered as an anhydrosugar, levoglucosan, or as levulinic acid and fine chemicals, mixed higher alcohols and more valuable fuels. Hemicellulose is comprised of C5 or C6 sugars such as xylose, arabinose, galactose, glucose and mannose. These sugars may be also fermented to ethanol or recovered as furfural and other derivatives and further processed to fine chemicals, alcohols and other commercial fuels. Lignin is a complex polymer which may be further processed to fine chemicals (such as phenol and fuel additives) or may be used as a direct fuel for the generation of heat and power for process and export.

The lignin component of lignocellulosic biomass materials gives physical strength to the biomass, and is tightly bound to the hemicellulose and cellulose components. Therefore, while it is desirable to fractionate the biomass, the presence of the lignin makes fractionation difficult, and the harsh conditions required for fractionation can result in breakdown of the carbohydrates into less desirable products.

Various methods have attempted to remove the carbohydrate sugars present in hemicellulose and cellulose from the biomass. For example, biochemical and chemical processes using enzymes, solvents, acid, alkali, or hot water can be used to attempt to dissolve the carbohydrate or lignin components of the lignocellulosic biomass with or without concomitant hydrolysis. In addition, various forms of pre-treatment such as steam explosion, hot water, and acid or alkali processes, attempt to make the carbohydrates accessible for separation. However, separating the biomass into fractions and isolating each of these fractions, while avoiding the production of byproducts and minimizing the consumption of energy (and therefore production cost) remains difficult.

The processes discovered to date for the conversion of biomass into fuel can be generally considered to be included in one or other of the following two categories. One category is a thermochemical treatment of whole biomass, without fractionation or separation of the component parts of the biomass, by means of pyrolysis, gasification or liquefaction, generating primarily a crude bio-oil or synthesis gas mixture. The other category includes physical and chemical pre-treatments of whole biomass, aimed at destruction or neutralization (rather than separation and collection) of the volatile or extractable components and the hemicellulosic components of the biomass (which would otherwise inhibit the subsequent conversion step or steps), followed by a chemical or microbiological (enzymatic) hydrolysis of the cellulosic components and a microbiological fermentation of the resultant cellulosic sugars. Other processes are also known which are generally of a chemical nature and carried out in the liquid phase, such as solvent dissolution and separation of one or more of the major components, including supercritical extraction processes. All such processes are generally directed at liquid transportation fuel production or at production of a specific chemical or limited range of chemicals or of products such as fiberboard.

SUMMARY

Embodiments of the inventions described herein include systems, methods and apparatuses for the fractionation of lignocellulosic biomass. This fractionation can be used for the recovery and isolation of hemicellulosic and cellulosic sugars including C5 sugars and C6 sugars, lignin, and/or other biomass components. The fractionation can be performed using continuous processes, such as one or more continuous steam tubes, allowing for a rapid and efficient separation of the biomass components.

Some embodiments of the present invention provide improved thermo-chemical processing functionality. Some systems receive raw biomass as input feedstock and produce relatively pure hemicellulosic sugars, cellulosic sugars and lignin as output. Some systems receive relatively pure lignocellulosic solid as input and produce both isolated sugars from the hemicellulose and a relatively pure lignin-cellulose solid as outputs. Some systems receive relatively pure lignin-cellulose solid as input and produce both isolated sugars from the cellulose and a lignin char. In some systems, one, two, or all three of the systems discussed in this paragraph can be included as sub-systems. Any of the systems discussed in this paragraph can be implemented as continuous-flow processes.

In some embodiments, the invention includes a method of fractionating and treating lignocellulosic biomass material including first, second and third steam reactors. The method includes preparing the biomass by reducing its size, treating the biomass using superheated steam and/or EM/EA treatments, and feeding the treated biomass into a first continuous superheated steam loop reactor to separate and hydrolyze hemicellulose and produce a solid and liquid component. The liquid component includes hydrolyzed hemicellulose in water or an aqueous solvent mixture and is separated from the solid component. The method further includes optionally feeding the biomass into a second continuous superheated steam loop reactor to reduce the water content of the biomass and/or to recover energy, feeding the solid component into a third continuous superheated steam reactor (e.g., a tube) to separate and hydrolyze the cellulose component and volatilize the products into the vapor stream and to separate this from a lignin char, and condensing the hydrolyzed cellulose and steam vapor.

In some embodiments, the invention includes a method for fractionating lignocellulosic biomass material including feeding the biomass into a devolatilization reactor to separate and collect volatile components of the biomass, feeding the biomass into a hemicellulose hydrolysis reactor to separate and hydrolyze hemicellulose, separating the biomass into a first solid component and a liquid component, wherein the liquid component includes hydrolyzed hemicellulose in water or solvent and wherein the solid component includes cellulose and lignin and has less than about 10% hemicellulose, feeding the solid component into a cellulose hydrolysis reactor comprising a continuous superheated steam reactor to hydrolyze and vaporize the cellulose component, and condensing the vaporized cellulose. In some embodiments, the cellulose hydrolysis reactor applies steam to the biomass at a temperature of at least 300° C. In some embodiments, the cellulose hydrolysis reactor applies steam to the biomass at a temperature of between about 400 and 550° C. The cellulose hydrolysis reactor may apply pressure to the biomass at 1-3 bara. In some embodiments, the cellulose hydrolysis reactor applies steam to the biomass at a temperature of between about 400 and 550° C. and at a pressure of 1-3 bara.

In some embodiments, the invention includes a method of isolating cellulose from a biomass including feeding a biomass into a cellulose hydrolysis reactor, the biomass including lignin and cellulose and less than about 10% hemicellulose, hydrolyzing and vaporizing a portion of the cellulose in the cellulose hydrolysis reactor, separating the vaporized cellulose from a remaining biomass solid, and condensing the vaporized cellulose. In some embodiments, the method further includes feeding the biomass into a hemicellulose hydrolysis reactor to separate and hydrolyze hemicellulose prior to feeding the biomass into the cellulose hydrolysis reactor. In some such embodiments, the method further includes separating the biomass into a first solid component and a liquid component, wherein the liquid component includes hydrolyzed hemicellulose in water or solvent, wherein the solid component includes cellulose and lignin and less than 10% hemicellulose, and wherein the step of feeding a biomass into a cellulose hydrolysis reactor includes feeding the solid component into the cellulose hydrolysis reactor.

The cellulose hydrolysis reactor may apply only steam to the biomass solid, or it may apply a mixture of steam and another gas. For example, the reactor may apply a mixture of steam and nitrogen, hydrogen, carbon dioxide, carbon monoxide, or combinations of more than one gas.

The cellulose hydrolysis reactor may also apply electromagnetic or electroacoustic (EM/EA) treatment to the biomass. For example, the cellulose hydrolysis reactor may apply Pulsed Electric Field, ultrasonic energy, microwave energy, or combinations thereof to the biomass in the reactor. In some embodiments, the cellulose hydrolysis reactor applies ultrasonic energy to the biomass, while in other embodiments it applies microwave energy to the biomass, while in still other embodiments it applies both ultrasonic and microwave energy to the biomass.

After hemicellulose hydrolysis and before feeding the biomass into the cellulose hydrolysis reactor, methods of the invention may feed the solid component of the biomass into a dryer to reduce the water content of the solid component. In some embodiments, the dryer is a continuous superheated steam reactor. In some embodiments, methods of the invention may include attriting the solid component after removing it from the hemicellulose hydrolysis reactor and before feeding the solid component into the cellulose hydrolysis reactor. For example, methods of the invention may include first drying the biomass and then attriting the biomass prior to cellulose hydrolysis.

The cellulose hydrolysis reactor may fully hydrolyze the cellulose to produce a vapor of cellulosic sugars and a lignin char. The cellulose hydrolysis reactor may produce a vapor of cellulosic sugars and a second solid component. The second solid component may be fed into a second reactor, which may be a superheated steam reactor. In some embodiments, the cellulose hydrolysis reactor partially hydrolyzes the cellulose, and the second reactor is a second cellulose hydrolysis reactor that completes cellulose hydrolysis and separates vaporized cellulosic sugar from the lignin. In other embodiments, the cellulose hydrolysis reactor completes hydrolysis of the cellulose and the second reactor reduces the lignin to a condensable gas that may be recovered.

Embodiments of the invention also include systems for fractionating lignocellulosic biomass material including a means for releasing volatile components from the biomass, a means for hydrolyzing hemicellulose in the biomass, a means for separating the biomass into a solid component and a liquid component wherein the liquid component includes hydrolyzed hemicellulosic sugars, and a means for hydrolyzing and vaporizing cellulose. The system may further include a means for drying the solid component of the biomass after separation of the solid component and the liquid component. In some such embodiments, the system may further include an attritor for attriting the solid component after drying. In some embodiments, the means for hydrolyzing and vaporizing cellulose includes an electromagnetic or electroacoustic generator to apply electromagnetic or electroacoustic treatment to the biomass.

In some embodiments, the method includes preparing a lignocellulosic biomass material having intact cells for fractionation including providing the biomass, feeding the biomass into a superheated steam reactor at elevated pressure, heating the biomass with superheated steam while maintaining elevated pressure to explode the biomass cells within the steam reactor, and separating the exploded biomass from the steam. In some embodiments, heating includes heating the biomass to a temperature of between about 150° C. and about 190° C. within about 5 to about 10 seconds. In some embodiments, the temperature of the biomass is increased to between about 150° C. to about 190° C. and the pressure is maintained at about 10 to about 15 bara. In some embodiments, the superheated steam reactor comprises a tubular structure wherein steam continuously circulates in a loop. In some such embodiments, the biomass flows through the reactor while entrained in the steam. In some embodiments, the method further includes applying EM/EA treatment to the biomass within the reactor. The EM/EA treatment may include microwave, ultrasound, pulsed electric field, or a combination thereof.

In some embodiments, the method of preparing a lignocellulosic biomass material having intact cells for fractionation further includes releasing volatile components from the biomass into the steam. The method may also include separating the volatilized components from the steam.

In some embodiments, the method of preparing a lignocellulosic biomass material having intact cells for fractionation also includes feeding the exploded biomass into a hemicellulose hydrolysis reactor to hydrolyze hemicellulose, separating the biomass into a solid component and a liquid component wherein the liquid component includes hydrolyzed hemicellulose and wherein the solid component includes cellulose and lignin, and feeding the solid component into a cellulose hydrolysis reactor to hydrolyze the cellulose component and separate the cellulosic sugars from the lignin. The hemicellulose hydrolysis reactor and/or the cellulose hydrolysis reactor may be continuous superheated steam reactors.

Embodiments of the invention also include systems for preparing a lignocellulosic biomass material having intact cells for fractionation including a tubular steam reactor, a steam inlet for entry of superheated steam into the steam reactor, a blower to continuously move steam through the reactor, a biomass inlet into the steam reactor for entry of the biomass material, and a biomass outlet within the steam reactor and downstream of the biomass inlet for removal of the biomass, wherein the reactor is designed to maintain the steam at a sufficient temperature and pressure to rupture or explode the biomass cells as the biomass passes between the biomass inlet and the biomass outlet. For example the temperature may be about 150° C. to about 190° C. and the pressure may be about 10 to about 15 bara. The blower may be designed to circulate the steam at sufficient speed for the biomass to be entrained within the steam and to pass from the inlet to the outlet in about 5 to about 10 seconds. In some embodiments, the reactor comprises a steam loop wherein steam continuously circulates through the loop. The system may further include an outlet for separating and removing volatile components of the biomass released by explosion of the biomass cells.

The system for preparing a lignocellulosic biomass material having intact cells for fractionation may further include a source of EM/EA treatment between the biomass inlet and outlet, such as a microwave, ultrasound, pulsed electric field generator, or a combination thereof.

Embodiments of the invention also include methods of fractionating lignocellulosic biomass material including feeding the biomass into a devolatilization reactor, feeding the prepared biomass into a hemicellulose hydrolysis reactor to separate and hydrolyze hemicellulose, separating the biomass into a solid component and a liquid component wherein the liquid component includes hydrolyzed hemicellulose in water or solvent and wherein the solid component includes cellulose and lignin, feeding the solid component into a cellulose hydrolysis reactor to hydrolyze the cellulose component, and separating the hydrolyzed cellulose from the lignin, wherein EM/EA treatment is applied to the biomass in the devolatilization reactor, the hemicellulose hydrolysis reactor, and/or in the cellulose hydrolysis reactor. The EM/EA treatment may include microwave, ultrasonic energy, pulsed electric field, or a combination thereof. The reactions in the reactors may be augmented, supplemented, or interspersed with the use of EM/EA treatment.

In some embodiments, the EM/EA treatment is applied to the biomass in both the hemicellulose hydrolysis reactor and the cellulose hydrolysis reactor. In some embodiments, the EM/EA treatment is applied at a parameter including frequency, pulse shape, power or duration, and one or more of these parameters is adjustable. The EM/EA treatments can aid in cell rupture (lysis), especially at low temperatures, increase the heat transfer rate throughout aggregates of cells, increase cell membrane permeability, degrade or reduce hemicellulose, cellulose and lignin polymeric structures, aid in hydrolytic and other reactions of the carbohydrate polymers, and aid the extraction of lipids, proteins and non-carbohydrate components of cells.

In some embodiments, the hemicellulose hydrolysis reactor is a recirculating tube reactor. In some embodiments, the cellulose hydrolysis reactor is a tube reactor.

In some embodiments, the devolatilization reactor comprises a superheated steam reactor at elevated pressure that rapidly heats the biomass with superheated steam while maintaining elevated pressure to explode the biomass within the steam reactor. In some such embodiments, the EM/EA treatment is applied to the biomass within the devolatilization reactor. The method may further include releasing, separating, and removing volatile components of the biomass in the devolatilization reactor.

In some embodiments, a system for fractionating biomass includes means for releasing volatile components from the biomass, means for hydrolyzing hemicellulose in the biomass, means for hydrolyzing and vaporizing cellulose, and a EM/EA generator for applying EM/EA treatment to the biomass in one or more of the above means.

In some embodiments, the invention includes a system for fractionating lignocellulosic biomass material comprising a first superheated steam loop reactor for exploding the biomass within the steam loop, a second superheated steam loop reactor for hydrolyzing the hemicellulose, a third superheated steam loop reactor for reducing the moisture content of the biomass, and a fourth superheated steam reactor for hydrolyzing cellulose into a vapor and forming a lignin char, wherein the biomass is continuously conveyed through the first, second, third and fourth steam reactors.

In some embodiments, the step of hemicellulose hydrolysis employs two or more stages of continuous processing. In some embodiments, the step of hemicellulose hydrolysis includes passing the biomass to a screw, extrusion or other conveyor system to continue hemicellulose hydrolysis. The hydrolyzed hemicellulose may be extracted using multi-step sequential washing, with water or water/solvent mixtures, and dewatering at high pressures. Alternatively, the hydrolyzed hemicellulose may be extracted by passing the biomass to a pressure of about 1-2 bara and leaching with water or water/solvent mixtures. In some embodiments, the hydrolyzed hemicellulose is dewatered by applying a high pressure screw or extrusion presses to the biomass. In some embodiments, the residual biomass solids include cellulose and lignin and less than 10% hemicellulose. The residual solids may then be attrited.

In some embodiments, energy is recovered in the form of high pressure steam, part or all of which is superheated, such as the carrier steam for the cellulose hydrolysis step.

BRIEF DESCRIPTION OF THE FIGURES

The following drawings are illustrative of particular embodiments of the present invention and therefore do not limit the scope of the invention. The drawings are not to scale (unless so stated) and are intended for use in conjunction with the explanations in the following detailed description. Embodiments of the present invention will hereinafter be described in conjunction with the appended drawings, wherein like numerals denote like elements.

DESCRIPTION

Figure 1:
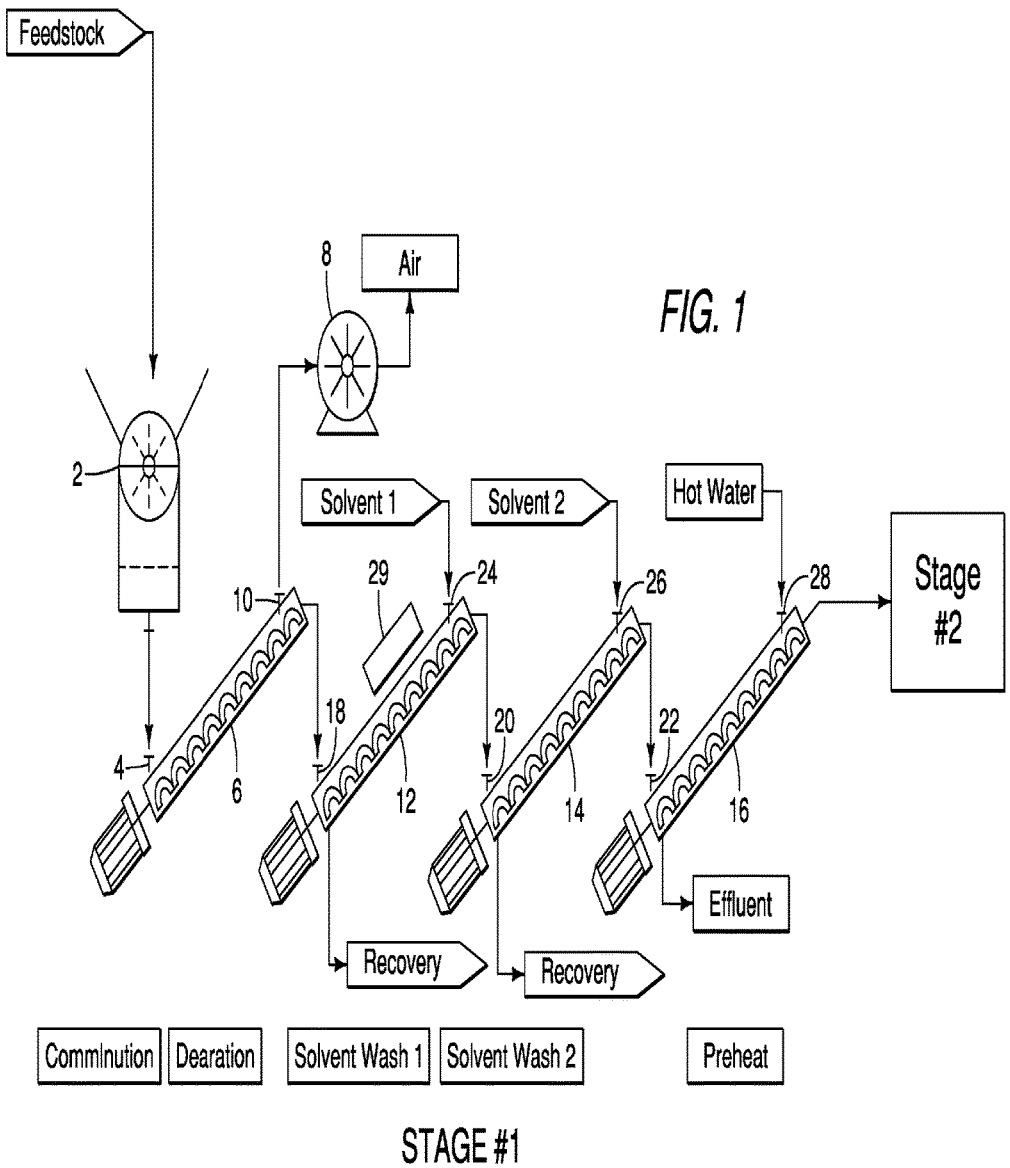
FIG. 1 is a schematic diagram of a system for the preparation of lignocellulosic material for fractionation.

The following detailed description is exemplary in nature and is not intended to limit the scope, applicability, or configuration of the invention in any way. Rather, the following description provides practical illustrations for implementing exemplary embodiments of the present invention. Examples of constructions, materials, dimensions, and manufacturing processes are provided for selected elements, and all other elements employ that which is known to those of skill in the field of the invention. Those skilled in the art will recognize that many of the examples provided have suitable alternatives that can be utilized.

Embodiments of the invention may be used to provide a full fractionation of biomass into all of its constituent parts (such as volatiles/extractables; hemicellulosic sugars; cellulosic sugars; lignin phenols; proteins; inorganic salts; etc.), while maintaining as much as possible the structural complexity of the individual monomeric chemical constituents. It thereby permits a very wide range of chemical and liquid transportation fuel products to be produced in a flexible and economic manner. From these primary products, a number of which are platform chemicals, the full complexity of the current organic chemicals industry can be recreated. The bio-oil produced is both less complex and less difficult, since it is primarily a product of cellulosic hydrolysis and depolymerization, with a much smaller contribution from other components, as compared to other processes.

Furthermore, embodiments of the invention may be designed to provide a low residence time, continuous, vapor phase process which is thus capable of extension to very large scales (such as 50,000 to 500,000 barrels per day oil equivalent) at a single site. This ensures economies of scale and matches the scale of petroleum refineries. The fuel products can thus be produced on scales commensurate with current global petroleum demand of 80 million barrels per day and secondary processing, on a bio-refinery complex, can be of equivalent current chemical industry scale.

Embodiments of the invention may also include the application of technologies not generally found in other such processes. These technologies may be employed to improve the heat and mass transfer to and from the biomass solids particles, which are generally limited in their capabilities and define the restrictions in their capabilities, thereby leading to increased yields and reduced reaction and residence times.

As such, embodiments of the invention may provide the primary component of an integrated bio-refinery, generating platform chemicals and fuel base stocks suitable for further chemical synthesis or refining, as appropriate.

Methods and systems of the invention include systems and processes for fractionating lignocellulosic biomass into monomeric and oligomeric components including C5 sugars and derivatives, C6 sugars and derivatives, lignin and other, minor, components. In some embodiments, some or all of the fractionation process uses a continuous flow process, making it possible to fractionate very large quantities of biomass with high efficiency and decreased cost.

The biomass is first prepared for fractionation. This preparation involves the standard operations normally involved for the specific biomass used (cleaning, etc.) and may include reducing the size of the biomass, deaerating the biomass, and/or pre-heating the biomass. It may also include the extraction of valuable components such as amino acids or oils. The biomass is then opened up by some means of cell disruption, such as steam explosion. In some embodiments, the steam explosion uses a process of rapidly heating the biomass in a continuous steam loop reactor under increased pressure, exploding the biomass cells and removing volatile components from the biomass. In other embodiments steam explosion may be supplemented, augmented or replaced by EM/EA treatments.

After preparation, extraction and devolatilization of the biomass, it is next subjected to hemicellulose hydrolysis. In some embodiments, the hemicellulose hydrolysis includes a two stage process including a first stage high pressure steam loop to begin hydrolysis, followed by a second stage holding system such as a conveyor system to complete the hemicellulose hydrolysis process. In other embodiments, the first stage of hemicellulose hydrolysis may include more than one high pressure steam treatment, followed by a second stage holding system. The hydrolyzed hemicellulose dissolves in aqueous solution and is separated from the remaining biomass solid by a leaching system.

The biomass solid may then be dried to a desired moisture content and may be comminuted to a fine particle size. However, in some embodiments, such as embodiments employing EM/EA treatments during cellulose hydrolysis, drying and comminution may not be included. The next step is hydrolysis of the cellulose. In some embodiments, the cellulose hydrolysis includes flash thermolysis. The flash thermolysis can be performed in a continuous steam reactor under low pressure and temperature, such as between about 350 and about 450 degrees Celsius. Under these conditions, the bond between the lignin and cellulose is broken and the hydrolyzed cellulose may be removed in a vapor stream with steam while the lignin forms a solid char. In some embodiments, cellulose hydrolysis is performed in two or more steps using two or more superheated steam reactors, with each subsequent reactor at a higher temperature than each previous reactor.

The methods and systems of the invention can be performed using continuous systems such as continuous steam reactors (e.g., loops, tubes, etc.) and conveyor systems, for example, allowing for a continuous processing system. As such, it avoids the time delays inherent in systems which use batch processing. The continuous processing systems described herein are also more energy efficient than batch systems, because they do not require repeatedly increasing temperature or pressure for each batch but rather the steam reactors must only maintain the desired temperature and pressure as the biomass materials enter and flow through the systems. Inherent accuracy of control permits a gradual increase of severity of treatment and results in a full and complex fractionation of the biomass.

Preparation of the Lignocellulosic Material

The biomass fractionation process begins with preparation of the biomass material. Embodiments of the invention may use any lignocellulosic material, such as hard or soft wood, grasses, agricultural waste, other plant material, municipal waste, or a combination of one or more biomass materials. Examples of wood useful in embodiments of the invention include pine, poplar, fir, spruce, larch, beech, oak, and palm trees and palm waste, for example. The material may include wood from trunks, stems, branches, roots, heartwood, wood trimmings, wood bark, saw dust, wood pruning and forest residue, for example. Agricultural material or waste which may be used in embodiments of the invention include, corn stover, corn cobs, corn kernels, corn fibers, straw, banana plantation waste, rice straw, rice hull, oat straw, oat hull, corn fiber, cotton stalk, cotton gin, wheat straw, sugar cane bagasse, sugar cane trash, sorghum residues, sugar processing residues, barley straw, cereal straw, wheat straw, canola straw, and soybean stover, for example. Grasses may include switchgrass, cordgrass, ryegrass, miscanthus, Bermuda grass, reed canary grass, and alfalfa. Other plant material may include wood and non-wooden plant material including stems, stalks, shrubs, foliage, bark, roots, pods, nuts, husks, fibers, vines, and algae. Municipal waste may include residential waste such as waste paper and food and industrial waste such as paper waste and board, papermill sludge and other cellulosic waste.

The biomass may be introduced into a preparation system from storage or direct from transit. It may first be passed through bag slitting or other automated decontainerization process, if required, and then to a metal detection and removal process and/or a pressure or other wash process, in which dirt and stones are removed from the biomass.

The biomass may then be conveyed and processed in a drying system, such as an air blast or other drying system, to remove excess surface water. The clean biomass may then be passed on to one or more comminution stages.

The lignocellulosic material undergoes comminution, such as by creating chips or flakes, in order to attain a desired particle size. This may be done by a flaking and sieving machine, a knife ring flaker with vibratory screen, for example. Particle size is chosen so as to keep the biomass in suspension and to permit heat transfer through the biomass within the continuous reactor systems, which depends on steam velocity, biomass density, and biomass shape, among other similar factors. In some embodiments, the material is comminuted to about 0.5 to 5 mm thick and about 12 to 80 mm in width and length. The preferred particle size may depend on the diameter of the tubes employed in the subsequent processing steps. Some embodiments comminute material to about 0.5 to 1.5 mm thick and about 12 to 15 mm in width and length. Some embodiments comminute material to about 2 to 5 mm thick and about 60 to 80 mm in width and length. The preferred size of flakes measure about 1 to 3 mm thick, and about 25 to 40 mm in length and width in some embodiments. Preferred material sizes can also be expressed in terms of equivalent diameters of spherical particles. Accordingly, preferred sizes may be about 5 to 10 mm in equivalent diameter. In some embodiments having cylindrical sections, such as grass type feedstocks, preferred sizes may be about 2 to 5 mm in diameter and 25 to 50 mm in length. Particle size is a function of the system capacity and hence dimensions, as well as feedstock characteristics, so that some embodiments may employ other size ranges.

Some material may be determined by a sieve to be undersized. In some embodiments, a proportion of undersized material can be added to the material of the desired size for further processing, with the remainder being passed to different processing systems. In some instances, a different processing system can be a system for fractionating the biomass, with the size of the system being configured to handle smaller material sizes (e.g., a smaller capacity, smaller diameter loop system). Oversized material can be recycled to the flaking or chipping machine and comminuted to the desired size. It is expected that a commercial system may have a number of reactor systems running in parallel, with each system processing biomass material of a different size and/or different feedstock.

In some embodiments, the biomass starting material may be comprised of many different materials, such as bark, twigs, and leaves. Processing such material to reduce its size also makes the material more homogenous and therefore better suited to processing. At the desired thickness, such as that described above, heat transfers to the center of the biomass sufficiently quickly, making it a useful size for use in the steam reactor processes described further below. In addition, the use of long thin pieces such as flakes, for example, allows for pieces which are thin enough for rapid heating but still have a sufficient size to allow for cyclonic separation of the solid biomass from steam, such as in a cyclonic separator, as may occur in various steps of the fractionation processes described herein. In some embodiments, the process of reducing the material size (e.g., by feeding, milling, and sieving) takes approximately one minute.

In some embodiments, the lignocellulosic material may be further processed to remove air from the biomass. This may be achieved by applying a vacuum to the biomass and/or displacing air in the biomass with an inert gas such as $CO_2$ or nitrogen. In some embodiments, subsequent steps of the fractionation process produce $CO_2$ which may be collected and used for deaeration of the biomass starting material. In some embodiments, the biomass material is placed under a vacuum or partial vacuum and an inert gas is drawn into the material, displacing the air and removing oxygen from the material. The removal of oxygen from the material is desirable in order to reduce the level of oxidative degradation of products and other undesirable reaction mechanisms, which may increasingly occur at elevated temperatures and pressures and in the presence of acidic catalysts. The yield of sugars and other preferred products may be reduced by oxidative degradation, leading to reduced yields of fuel and other secondary products. Degradation can also generate gaseous products, such as $CO_2$, which can result in waste of the feedstock.

The preparation of the lignocellulosic material may optionally include the removal and collection of volatile and other non-lignocellulosic components such as essential oils, terpenes, amino acids, etc. where these components exist in significant proportions and have commercial value. For example, eucalyptus oil may be removed and isolated prior to fractionation of eucalyptus wood in order to extract the maximum value from the feedstock. Proteins and amino acids may be removed from grasses and crop wastes, for use in animal feed or pharmaceuticals. These components may be recovered for their commercial value and/or to prevent interference with the fractionation process or contamination of the fractionation products. They may be removed using a fully continuous process. In some embodiments, these components are removed through one or more extraction steps. In some embodiments, the extraction steps comprise a continuous countercurrent extraction process using one or more solvents. The extraction step may utilize one or more EM/EA treatments such as pulsed electric fields (PEF), ultrasonic energy (US) and/or microwave (MW) to lyse cells and to effect mass transfer of the components of interest into the solvents. The EM/EA treatments may be applied to the biomass either immediately prior to or during extraction. These extractions may be done at ambient temperature or at an elevated temperature, such as a temperature between ambient and approximately 150 degrees Celsius, or between about 60 and about 120 degrees Celsius. The solvents may be chosen based upon the type of soluble component to be extracted. Examples of suitable solvents include hydrocarbons, such as mineral oil, ketones, alcohols and/or aromatics. In some embodiments, a first solvent is applied to the biomass material and the soluble component or components are removed from the material by flowing the solvent through the material, collecting the solvent, and isolating or separating out the soluble component. A second solvent is then applied to the material to allow the first solvent to be washed out using a subsequent water wash. The second solvent may also be collected and the soluble component and/or first solvent may be separated out from the second solvent and isolated. For example, the second solvent may be both hydrophilic and hydrophobic so that it is able to dissolve the first solvent and can then be washed out with the subsequent water wash. One or more water washes may then be flowed through the material. In some embodiments, such extraction steps can take approximately two-and-a-half minutes, with each step taking approximately one minute plus approximately 30 seconds for total feed and discharge.

The step of extraction of volatile and other non-lignocellulosic components may be performed by counter-current or co-current continuous extraction equipment, such as a single or double screw conveyor or extruder, a vertical plate extractor, a rotary extractor, or a centrifugal extractor, for example.

In some embodiments, the optional removal of volatile and other non-lignocellulosic components may be provided as a side stream. In such embodiments, the portion of a biomass for which extraction is desired may be diverted to the side stream, such as a series of countercurrent extractions as described above. The flow to the extraction side stream may then be stopped and biomass flow without extraction may proceed directly to the preheating step or to the hemicellulose hydrolysis reactor. In such embodiments, the flow of biomass from a preparation stage includes a branch for optional extraction or for bypassing extraction. Such systems allow flexibility in handling various biomass materials for which extraction may or may not be desired.

The lignocellulosic material may be further processed by preheating the material. For example, the material may be preheated using live steam (i.e., steam injected directly into the process), hot solvent or indirect heating. For example, in some embodiments, the material may be preheated using low pressure steam. In some embodiments, the low pressure steam may be applied to the material using a continuous process including a conveyor, such as a screw conveyor. The material may be preheated to a temperature between approximately 100 and approximately 200 degrees Celsius, such as a temperature between approximately 120 and approximately 150 degrees Celsius. The material is preheated in order to reduce the thermal demand in the first steam reactor and to ensure the reactor operating temperature is rapidly attained. The temperature is preferably kept below that at which significant hemicellulose hydrolysis occurs, such as less than 180 degrees Celsius. In some embodiments, the process of deaerating and preheating the biomass can take approximately two to three minutes.

In some embodiments, the process for removal of the non-lignocellulosic components described previously is a hot solvent extraction process. In such a process, one or more of the solvents are at an increased temperature when applied resulting in heating of the biomass. The hot solvents can therefore perform the function of pre-heating the biomass to a desired temperature as well as extraction.

In some embodiments, a water content adjustment step may be included to bring the water content of the biomass to the desired level. For example, it may be necessary to add water to dry biomass such as straw. Water may be added as steam or water during a preheating step as described above. Alternatively, water may be added to the devolatilization reactor to supplement the water released from the biomass, to maintain the superheated steam mass flow rate required. For example, the water content may be increased to about 50%.

Figure 2:
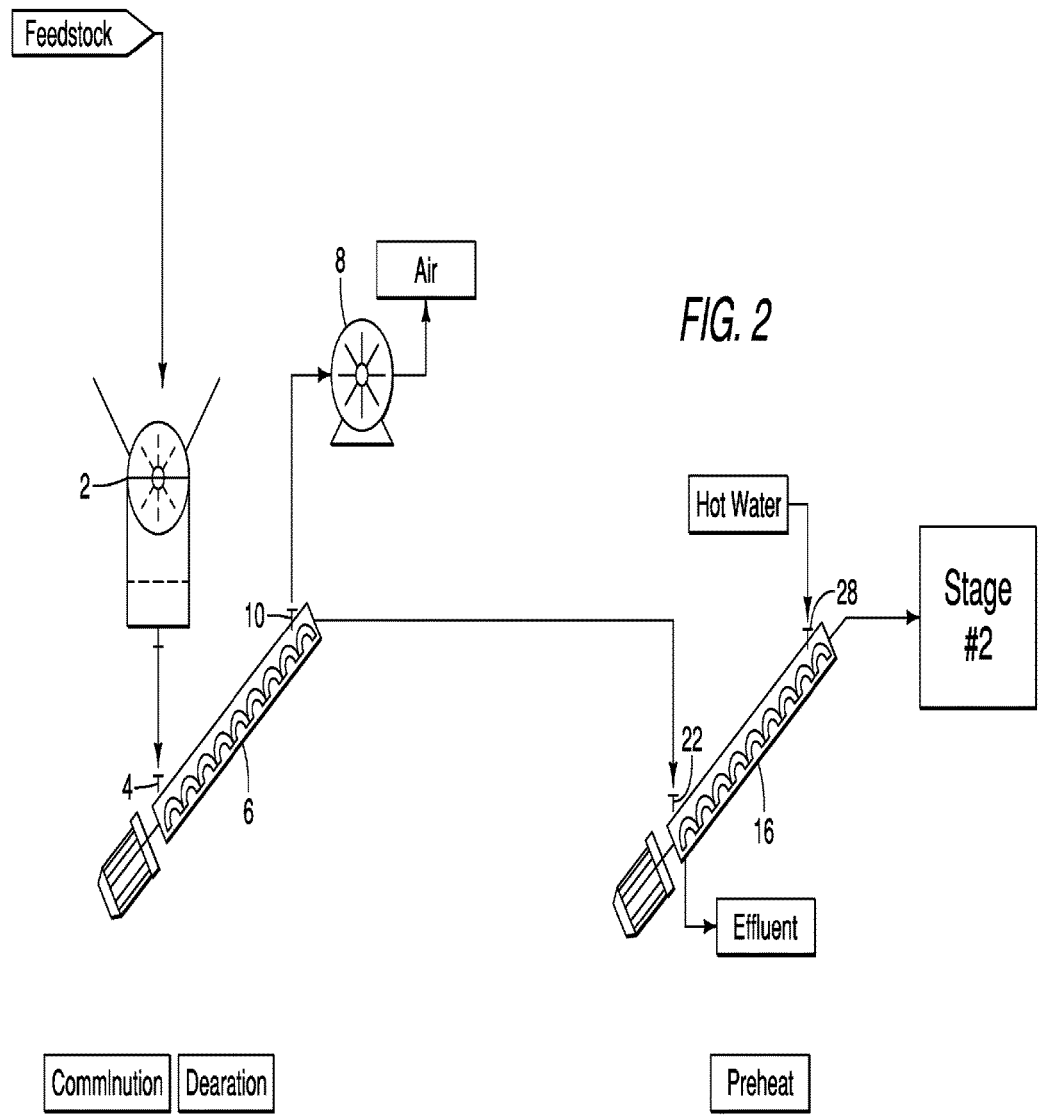
FIG. 2 is a schematic diagram of an alternative system for the preparation of lignocellulosic material for fractionation.

Embodiments of systems for preparing of a lignocellulosic biomass material for fractionation are shown in FIGS. 1 and 2. A lignocellulosic biomass material is fed from feedstock storage into a flaking and sieving machine 2 to reduce the feedstock to a desired size. The feedstock is then passed into a deaeration system inlet 4 and then into a deaeration system 6 which removes the air from the biomass using a vacuum 8. The vacuum is broken (or the air displaced) with an inert gas ($N_2$ or $CO_2$). The deaeration system 6 includes a conveyor, such as a screw conveyor, which transports the biomass to the deaeration system outlet 10 through which the biomass exits the deaeration system 6.

In the system shown in FIG. 1, the biomass next passes to a first, second, and third solvent wash system 12, 14, 16, each of which includes an inlet 18, 20, 22 and an outlet 24, 26, 28, although alternative embodiments could include more or less than three wash systems. In each solvent wash system 12, 14, 16, the biomass enters through the inlet 18, 20, 22, is conveyed through the system 12, 14, 16 on or in a continuous processing unit such as a screw conveyer, and exits through the outlet 24, 26, 28 to pass on to the next step of the process. The solvent wash systems 12, 14, 16 as shown are each countercurrent wash systems. The first solvent wash system 12 uses a first solvent, and may also be equipped with one or more systems employing one or more of the EM/EA treatment generators 29 (such as PEF, US, MW) which open up the cells and enhance extraction of the components of interest into the solvent. The second solvent wash system 14 uses a second solvent. The soluble component dissolved in each solvent is recovered from each solvent wash after passing or flowing through the biomass. The solvents may then be reused for further solvent washes. Following the two solvent washes, the biomass is washed in the third solvent wash system 16 with hot water, again using a countercurrent system. In some embodiments, the water is at a temperature of between about 90 and about 200 degrees Celsius. In other embodiments, the water is at a temperature of between about 120 and about 150 degrees Celsius. The solvent is removed from the biomass by the hot water, while at the same time the hot water preheats the biomass to the desired temperature before the biomass passes to the next step of the fractionation process. In some embodiments, the next stage is devolatilization of the biomass.

An alternative biomass preparation system is shown in FIG. 2. In this system, there are no solvent washes and as such it may be used when there are no valuable extractives. However, the system may still employ a hot water wash 16 as described with regard to FIG. 1. In such embodiments, the hot water wash 16 functions to preheat the biomass prior to further processing.

It should be recognized that the systems shown in FIGS. 1 and 2 may represent two distinct systems. Alternatively, one system may include both the process shown in FIG. 1 and the process in FIG. 2 as alternative pathways. In such an embodiment, the system may include a diverter valve or two separately controlled transfer feeders after the deaeration stage allowing the biomass to optionally proceed through solvent extraction or to bypass solvent extraction and pass directly to preheating. Such a system may be used when a portion of the biomass which will be processed includes valuable extractives while another portion does not include such extractives.

One or more of the EM/EA treatments 29 (such as PEF, US, MW) can be used in connection with one or more of the wash systems 12, 14, 16 to enhance the performance of the wash systems 12, 14, 16. For example, one or more of the solvent wash systems 12, 14 or the water wash system 16 may include a pulsed electric field generator for applying PEF to the biomass before it enters into, or as it passes along, the solvent wash conveyor. The PEF may create holes in the cell walls which may allow for more rapid extraction of materials from the biomass. The PEF parameters vary with feedstock, but in some embodiments may include field intensity 10 to 20 kv/cm, pulse duration 5 to 10 microseconds, pulse period 10 to 20 milliseconds, and/or exposure time 0.1 to 0.2 seconds, for example.

Devolatilization

Embodiments of the invention include a process of devolatilization. In some embodiments, volatile components (such as residual gases, low molecular weight organics and some oils and lipids) are removed from the biomass by single or multi-stage steam distillation or flash volatilization. In some embodiments, a unique form of steam explosion using a continuous process of very rapid steam heating may be used to break apart the biomass cells. This process subjects the biomass material to high temperature and moderate to high pressure, causing water in the cells to expand and vaporize, leading to an increase in internal pressure sufficient to rupture or explode the cells. In other embodiments, the biomass is ruptured using a combination of steam and one or more of the EM/EA treatments in a similarly continuous process.

The continuous flow steam explosion (or enhanced steam rupture) process provides several advantages, including continuously passing the biomaterial through the system, fine control of processing conditions, improved energy conservation, and the ability to remove and collect the volatile components contained within the biomass. The continuous flow steam explosion (or enhanced rupture) process may be performed using superheated steam, such as in a superheated steam tube such as a steam loop. The biomass is fed into the steam tube where it is exposed to the superheated steam, quickly raising the temperature of the biomass. In addition to cell rupture by simple steam heating, rupture may be caused by cavitation and cell wall permeabilization or poration. Because of the speed of the heating, the steam is unable to diffuse out of the cell before it causes the cell to burst. Therefore, while the cells are still under elevated pressure and temperature within the steam tube, the biomass cells burst or explode, opening up the cells. By rupturing the cell structure, the components become more accessible, allowing the subsequent fractionation of hemicellulose, cellulose, and lignin.

In some embodiments, the superheated steam is at a temperature of between about 120 and about 220 degrees Celsius and a pressure of between approximately 6 and approximately 16 bara. In some embodiments the temperature is preferably between 150 and 190 degrees Celsius and the pressure 10 to 15 bara. At this temperature and pressure, the biomass can be heated up very quickly without forming a char or suffering significant hydrolysis of the carbohydrate fractions.

The superheated steam may be flowing through a pipe, tube or similar structure. For improved energy efficiency, the steam may flow in a continuous loop under the force of a blower or fan. When the biomass is injected into the pipe, it becomes entrained in the steam and is conveyed with the steam such that the particles of biomass are suspended and moving through the pipe without settling to the bottom of the pipe. In addition, the steam and biomass may be conveyed through the system at a high velocity, generally at velocities of 10 to 25 m/s and preferably at velocities of 15 to 20 m/s. By using this superheated steam entrainment process, the biomass heats up much more quickly than with a stationary or batch process, allowing for the rapid heating required for the steam explosion to occur. This can create a highly turbulent flow, which, together with the high temperature vapor and high surface condensation film coefficients, allows for faster transfer of heat from the steam to the biomass. It is believed that the steam condenses on the outside of the biomass particle, causing heat transfer to the biomass by conduction, convection and radiation.

In addition, the use of EM/EA treatments, with the high velocity steam, can substantially increase the rate of energy transfer, from the periods of hours or tens of minutes for batch processes to seconds, with PEF, for example, acting to open cell membranes in microseconds. The EM/EA treatments may be applied to the biomass immediately before entering the devolatilization tube or as it passes through the devolatilization steam tube. A portion of the tube may be a pulsed electric field generator, ultrasonic energy generator or microwave generator, directing the EM/EA treatment into the tube. In some embodiments, PEF may be applied to the biomass during devolatilization. Again, PEF parameters vary with feedstock and may include field intensity 10 to 20 kv/cm, pulse duration 5 to 10 microseconds, pulse period 10 to 20 milliseconds, and/or exposure time 0.1 to 0.2 seconds. In other embodiments, ultrasonic energy may be applied to the biomass during devolatilization. US parameters may include frequency 20 to 40 kHz and/or exposure 30 to 90 seconds. In still other embodiments, both PEF and ultrasonic energy may be applied to the biomass during devolatilization. Either the PEF may be applied first, followed by the US, or the US may be applied first followed by the PEF. The US, for example, may heat the biomass cells from the inside out, in a matter of seconds, while the steam transfers heat from the outside of the biomass inward. The US therefore allows for a faster and more efficient devolatilization process. In some embodiments, the entire process of devolatilizing the biomass can take approximately one-and-a-half to three minutes (including approximately four to five seconds in a superheated steam loop).

The use of a superheated steam tube such as a steam loop for various reaction processes including devolatilization and hemicellulose hydrolysis, for example, allows for precise control of temperature and pressure conditions as well as the entrainment time of the biomass within the system. In addition, the transit time of the biomass within the system can be controlled by controlling the speed of the blower to increase or decrease the speed of the steam in which the biomass is entrained. Therefore the temperature, pressure and speed of the biomass can all be carefully and independently controlled to optimize the process. A single loop residence time may be of the order of 5 to 10 seconds.

The continuous flow steam explosion opens the structure of the biomass cells to allow for fractionation of the biomass and also releases the volatile and non-carbohydrate components from the biomass, such as acids, oils, and terpenes (e.g., Turpentine and essential oils). The volatile components are vaporized by the elevated temperature and also undergo steam distillation due to the superheated steam. The steam distillation process reduces the effective boiling point of certain volatile components, such as organic components like oils, to a temperature which is lower than the pure component boiling point at atmospheric temperature, resulting in the volatilization of the components at a lower temperature than would otherwise be required. This makes it possible to remove more volatile components than would otherwise be possible by heating to a specific temperature alone without the presence of superheated steam.

The volatile components released by the steam explosion process can be collected, such as by allowing the vapors to pass to a gas collection device such as a condenser, such as a direct contact condenser, scrubber or similar apparatus. The gas collection device may be provided in line within the steam tube or loop to allow for a continuous and uninterrupted flow of biomass material and steam and may operate continuously, allowing the steam and biomass to continuously flow through. In addition to removing volatile components, any remaining oxygen or any inert gases within the biomass may be removed by the steam explosion process as well, thereby performing or completing the deaeration process. The continuous flow superheated steam process therefore results in devolatilization through flash steam distillation, steam explosion (with or without EM/EA treatment) of the biomass cells, and complete deaeration of the biomass.

Examples of continuous steam reactors which may be used for the devolatilization process include, for example, conventional single or multi-tube reactors with or without static or rotating internals, screw conveyors or extruders, fluidized bed reactors such as bubbling, spouted, or circulating bed reactors, ablative reactors, and, in general, any single pass continuous system.

Prior to entering the steam reactor used for the continuous flow steam explosion, the biomass is at atmospheric pressure, while within the steam reactor it is at an elevated pressure. Therefore the biomass must be injected into the steam reactor using a solids feeding system which can operate against this pressure differential. In one embodiment, the solids feeding system is a lock hopper/blow tank type system. This system is a discontinuous system operated in a rapidly cycled manner, but may be made to operate in an essentially smoothly continuous manner through the addition of a conveyor system such as screw or rotary feeder. In another embodiment, the solids feeding system is a solids pump, a centrifugal device in which friction is utilized to move solids in a plug flow. Such solids feeding systems may be used at any of the various steps described herein where a solids feeding system is called for, or anywhere the biomass is transferred from one system or step to another.

Figure 3:
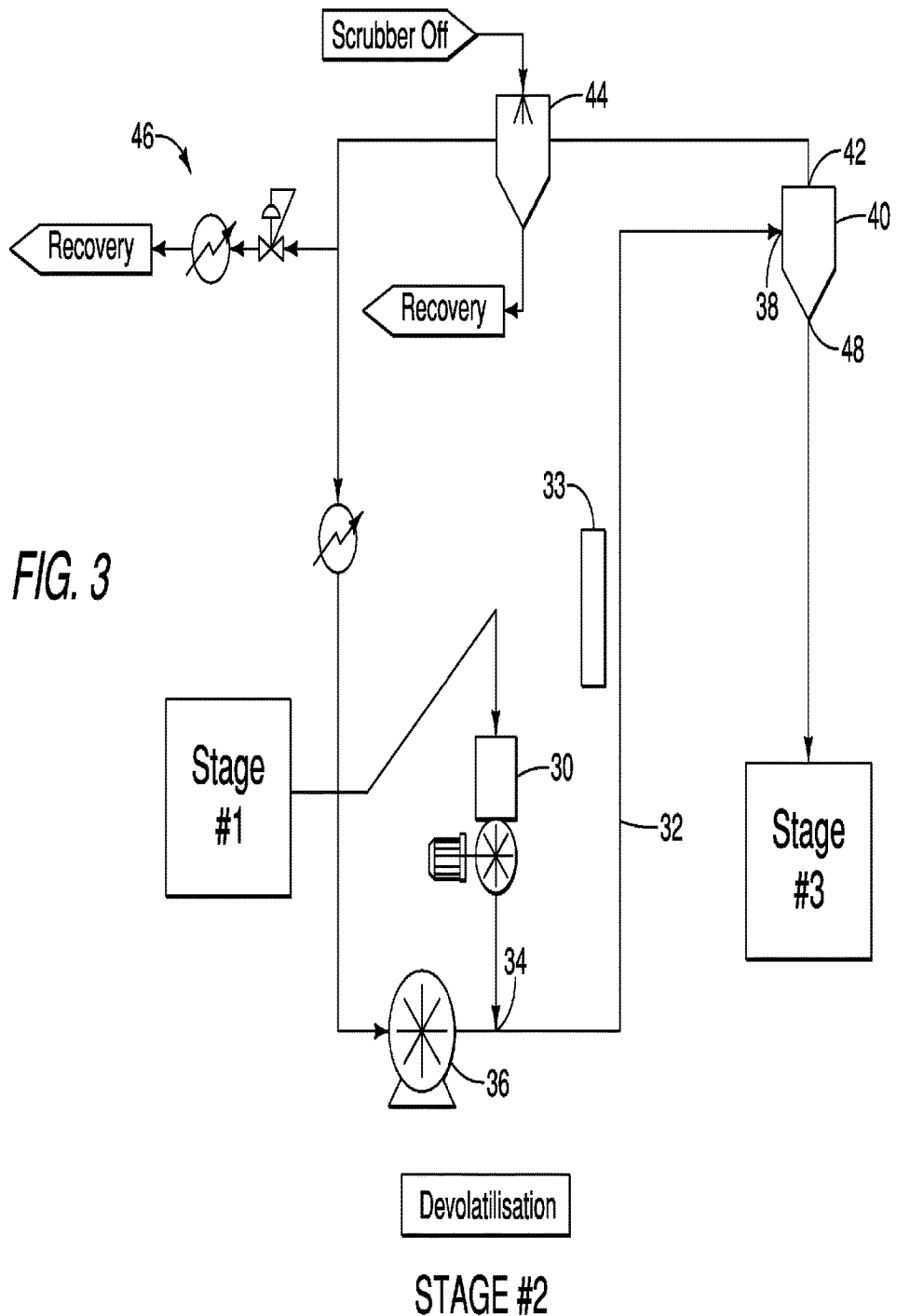
FIG. 3 is a schematic diagram of a devolatilization system.

An embodiment of a system and process for continuous flow high pressure steam explosion (and enhanced cell rupture) is shown in FIG. 3. The prepared biomass, such as the biomass resulting from the process shown in FIG. 1 or FIG. 2, is fed into a solids feeding system 30. The biomass is then injected into the continuous steam loop 32 at a steam loop inlet 34. A blower 36 in connection with the steam loop 32 pushes the steam and the entrained biomass through the steam loop 32. Within the steam loop 32, the biomass is rapidly heated using superheated steam at a high temperature and pressure, optionally together with one or more of the EM/EA treatment generators 33, to disrupt or explode the cellular structure of the biomass, release volatile components and prepare the biomass for fractionation, while the biomass is conveyed within the steam loop 32. The steam exploded, or disrupted, biomass travels through the steam loop 32 to a separator inlet 38, in line with the steam loop 32 to enter the separator 40. The separator 40, such as a cyclonic separator, separates the solid biomass from the steam and volatilized components. Steam exits the separator 40 along with the volatilized components and inert gases through a first separator outlet 42 to continue circulating through the steam loop 32. The steam and volatilized components pass to a gas collection device 44, such as spray tower, which scrubs out the soluble volatilized components. Remaining inert and other gases and vapors pass on and a portion of these, together with a similar proportion of the steam, are removed from the loop under pressure control from pressure control device 46. Pressure control device 46 can compensate for increased loop pressure caused by inert gases and low-boiling volatile vapors by venting some of the gases, vapors (and steam) to balance the pressure in the loop. Condensable components can then be condensed out by a condenser or removed by a separate scrubber, for example, for recovery. The remaining steam and gases recirculate back to the blower 36 and through the steam loop 32 for reuse. The exploded biomass exits the separator 40 through a second separator outlet 48 to exit the steam loop 32 and pass to the next stage of the fractionation process. In some embodiments, the biomass passes onto the hemicellulose hydrolysis stage after devolatilization.

In some embodiments, the solids exiting the separator 40 are fed into one or more additional steam explosion systems, such as one or more steam loop 32 and separator 40 systems, to repeat the process of steam explosion on any biomass that remains unexploded. In such embodiments, any additional volatile components may again be collected and the fully exploded (or open) solid biomass may then be passed on to the next step of the fractionation process.

Hemicellulose Hydrolysis

After the preparatory steps are completed, the biomass is now ready to undergo extraction of the hemicellulose. The hemicellulose may be removed from the biomass by any method or combination of methods, such as hot water, acid or alkali processes. In some embodiments, the hemicellulose is removed by hydrolysis using superheated steam. In some embodiments, the entirety of the preparatory steps can take approximately seven to nine-and-a-half minutes with oil extraction or four-and-a-half to seven minutes without oil extraction.

In some embodiments, the hemicellulose is hydrolyzed using superheated steam, in a continuous process, such as by entraining the biomass in a continuous steam reactor (e.g., a loop, a tube, etc.). Examples of continuous steam reactors which may be used for hemicellulose hydrolysis include, for example, conventional single or multi-tube reactors with or without static or rotating internals, screw conveyors or extruders, fluidized bed reactors such as bubbling, spouted, or circulating bed reactors, ablative reactors, and, in general, any single pass continuous system.

In some embodiments, the steam is applied to the biomass at a pressure of about 10 to 35 bara and a temperature of about 170 to 250 degrees Celsius. In other embodiments, the pressure is 23 to 32 bara and the temperature is 220 to 240 degrees Celsius. The temperature and pressure are sufficient to hydrolyze the hemicellulose while minimizing or avoiding degradation of the biomass material. While both the hydrolysis and degradation reaction kinetics are functions of time, temperature and conditions such as pH, they exhibit different optima, so that it is possible to maximize recovery of product sugars by selection of appropriate operating conditions. In some embodiments, a single steam reactor is used, while in other embodiments two or more steam reactors are used in series with the conditions of each reactor selected to obtain different products.

In some embodiments, the hydrolysis step employs one or more of the EM/EA treatments, such as those discussed elsewhere herein, to improve heat transfer and aid in the hemicellulose breakdown. For example, one or more of PEF, US or microwave may be applied to the biomass in, or prior to, the hemicellulose hydrolysis reactor. In some embodiments, ultrasonic energy is produced by an ultrasound generator within, or immediately before, the reactor to direct ultrasonic energy to the biomass as it enters into, or passes through, the reactor. The ultrasonic energy parameters vary with feedstock and desired reaction or products and may typically be: frequency 20 to 40 kHz or 200 kHz to 1 MHz; duration 1 to 5 seconds or 30 to 90 seconds. The ultrasonic (or microwave) energy may provide a supplemental method of heating the biomass in the hemicellulose reactor by heating the biomass internally, making the hemicellulose hydrolysis reaction quicker.

In some embodiments, the hemicellulose hydrolysis begins in a first superheated steam stage or location, such as a continuous steam tube or loop, and then continues in a second superheated or saturated steam location or stage, such as outside of the steam tube or loop. In some embodiments, this second stage is at approximately the same temperature and pressure as the first stage, with the second stage acting as a holding system, allowing the hemicellulose reaction which began in the reaction chamber or steam loop to reach completion. The biomass may be maintained in this holding system for a sufficient time for the hemicellulose hydrolysis reaction to reach completion, such as about one to two minutes, for example, at a desired temperature. Completion of the hydrolysis reactions could be carried out at a lower temperature, but longer residence times would be required to complete hydrolysis. The holding system may comprise a holding tank, for example, or may be a conveyor system, such as a slow moving conveyor. Alternatively, the entire process of hemicellulose hydrolysis may occur within a single stage or location, such as by keeping the biomass in a reaction chamber or keeping it within the steam tube or loop for a longer time, sufficient for the hemicellulose hydrolysis reaction to reach completion. However, the length of the steam loop/tube is directly proportional to the cost of the system, therefore it may be more expensive to lengthen the steam tube or loop than to include a separate second stage outside of the steam loop/tube.

The reaction process begins in the superheated steam environment. However, the two steps of the reaction do not necessarily correlate with the two stages of the superheated steam process described above. The superheated loop/tube section is employed to provide the heat transfer to get the reaction started, aided, where desirable, by EM/EA treatments. Thereafter the reaction parameters may be determined based on economics and convenience. It should be noted that hemicelluloses and celluloses are not single, pure molecules but mixtures of polymers, copolymers and cross-linked polymers, formed from a number of monomer sugars. Each such polymer has its own hydrolysis kinetics.

In some embodiments, two or more hemicellulose continuous superheated steam reactors are provided in a series. The first reactor may be at a lower temperature than the second reactor. If a third reactor is used, then the temperature of the second reactor may be lower than the third reactor. For example, the first hemicellulose reactor may partially hydrolyze the hemicellulose (using a lower temperature and/or shorter reaction time than the second reactor), producing oligomers, such as oligomers having 2-20 sugars. These oligomers and other products would then be removed, such as by leaching or high pressure press, and the remaining solid component would then proceed for further processing. In the second hemicellulose reactor, hemicellulose hydrolysis could be completed, producing hemicellulosic sugar monomers.

The hydrolyzed hemicellulose is next removed from the biomass. The C5 and some C6 sugars produced by hemicellulose hydrolysis are generally soluble in water and may be dissolved in the water surrounding and absorbed into the biomass after exposure to the superheated steam. This solution can be a relatively complex sugar solution, comprising the particular monomer sugars of the selected feedstock, plus some oligomers of the hemicelluloses and some sugars, oligomers, etc. of the celluloses and sugar derivatives (anhydrosugars, etc.). Further contaminants can include residual volatiles, such as acetic acid, alcohols, etc. and any other soluble components such as amino acids, mineral salts, etc.

In some embodiments, the sugars are removed from the biomass in a single or in multiple stages, using additional water and sequences of washing and liquid/solid separation. For example, the C5 and C6 sugars may be removed using a counter-current water flow to leach the C5 and C6 hemicellulose sugars from the biomass solids. In some embodiments, the C5 and C6 sugars may be removed after first dropping the pressure, such as to between about atmospheric and about 2 bara, and then venting the vapors to flash off some of the water containing the dissolved sugars. The flash steam, which will contain entrained sugar-laden liquor, may be condensed in a direct or indirect condenser and the recovered liquor sent for sugar recovery. The hydrolyzed hemicellulose sugars are then leached from the biomass. In some embodiments, low pressure leaching employs a counter-current water flow to remove dissolved hemicellulosic sugars. In other embodiments, the dissolved hemicellulosic sugars may be removed using one or more high pressure wash and separation stages, such as using extrusion or compression equipment such as high pressure screw presses, and continuous wash equipment such as counterflow conveyors or screws. In some embodiments, the dissolved hemicellulosic sugars may be removed using both presses and low pressure leaching processes. In some embodiments, the entire hemicellulose hydrolysis and removal process can take approximately one-and-a-half to three minutes.

The step of leaching or expressing the biomass for removal of the hemicellulosic sugars and separation of the biomass into a liquid component and a solid component may be performed by counter-current or co-current continuous extraction equipment, such as a single or double screw conveyor or extruder, a vertical plate extractor, a rotary extractor, or a centrifugal extractor, for example.

The isolated hemicellulose sugars including C5 and C6 sugar monomers and oligomers (and derivatives such as anhydrosugars, aldehydes, etc.) are useful as individual products and have various commercial uses. In some embodiments, some C5 sugars and sugar derivatives may be used for fermentation, such as for the production of alcohols, including ethanol and higher alcohols, such as butanol. Such fermentation processes may be performed in conjunction with the fractionation process or may be performed separately. In some embodiments, the isolated C5 sugars may be further processed, such as for conversion into other chemicals. For example, C5 sugars may be converted into furfural. Hemicellulose hydrolysis products may also be passed on for further processing in parallel with, or in conjunction with, cellulose hydrolysis products. Some of these processes are identified later, in the discussion of cellulose processing.

Figure 4:
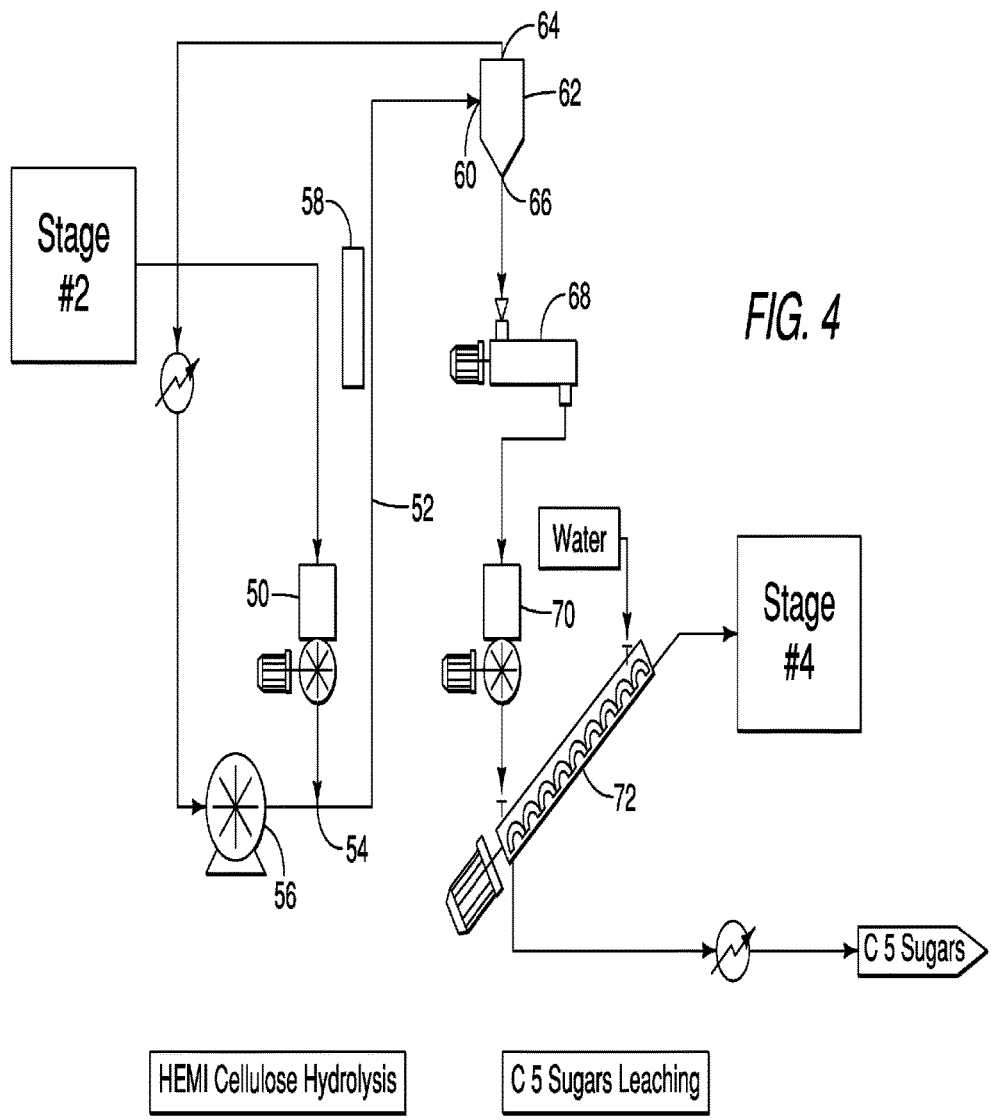
FIG. 4 is a schematic diagram of a continuous flow steam loop reactor for hemicellulose hydrolysis and fractionation.

An embodiment of a two stage system and process for continuous flow hemicellulose steam hydrolysis is shown in FIG. 4. Biomass, such as the devolatilized biomass produced by the system of FIG. 2, passes to a solids feeder system 50, like the solid feeder systems previously described. The solids feeder system 50 injects the biomass into the continuous steam loop 52 at the steam loop inlet 54. The steam and the entrained biomass are moved through the steam loop 52 by the blower 56, which circulates the steam through the steam loop 52. The biomass flows turbulently and heats up rapidly within the steam loop 52, beginning the hemicellulose hydrolysis. Again, an EM/EA treatment generator 58 may also be optionally employed in this loop. The biomass passes through the steam loop 52 through the separator inlet 60 to the separator 62, such as a cyclonic separator, which separates the steam from the biomass. The steam exits the separator 62 through a first separator outlet 64 to continue circulating through the steam loop 52. The heated biomass exits the separator 62 through a second separator outlet 66 and passes to the holding system 68, which in the embodiment shown is a slow moving screw conveyor at the same temperature and pressure as the steam loop 52. The hemicellulose hydrolysis continues to completion within the holding system 68. At the end of the holding system 68, the biomass is moved to a solids feeder system 70 and into the hemicellulose sugar leaching system 72. In the embodiment shown, water is flowed through the biomass to wash out the sugars in a countercurrent manner as the biomass moves along the conveyor. The water exits the leaching system for recovery of the hemicellulose sugars. This low-pressure leaching can take approximately four-and-a-half to five-and-a-half minutes. The hemicellulose sugars may then be separated from the water by conventional distillation or by techniques such as pervaporation and filtration (using membranes), reactive distillation or extraction, for example. The solid biomass from which the hemicellulose has been removed and which now includes cellulose and lignin passes out of the leaching system 72 and continues on for further processing. The solid biomass may include very little hemicellulose, such as 5% to 10% by weight hemicellulose. In some embodiments, the solid biomass passes on for removal of the cellulose sugars, such as by the system shown in FIG. 8.

Figure 5:
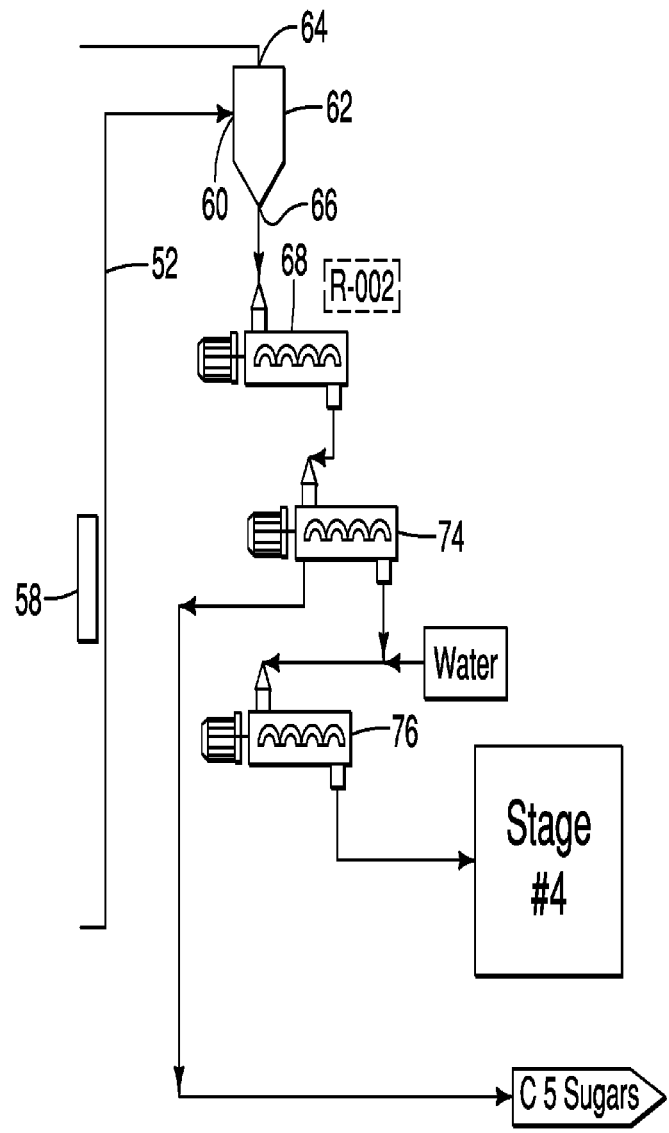
FIG. 5 is a schematic diagram of another embodiment of a continuous flow steam loop reactor for hemicellulose hydrolysis and fractionation.
Figure 8:
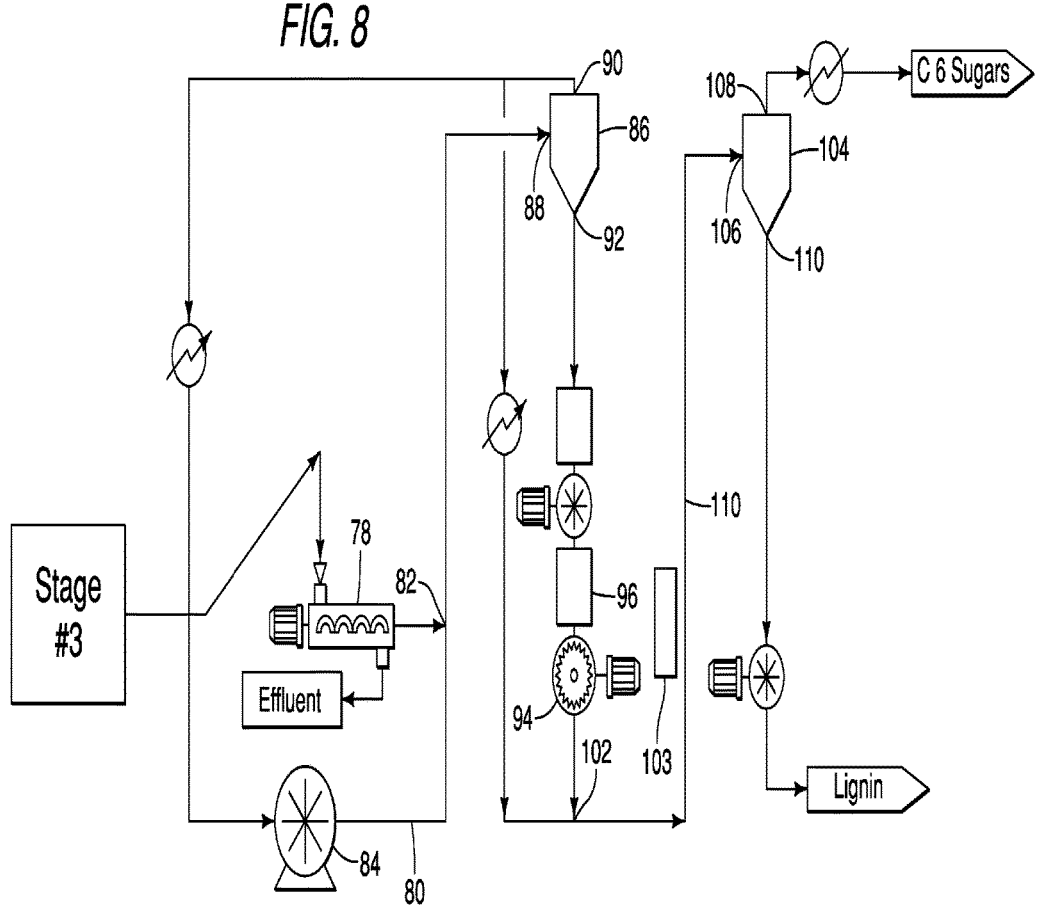
FIG. 8 is a schematic diagram of a continuous flow flash thermolysis system for the hydrolysis of cellulose and the fractionation of cellulose and lignin.

An alternative embodiment is shown in FIG. 5. As in FIG. 4, hemicellulose hydrolysis is performed using a steam loop and a screw conveyor. In this alternative embodiment, the biomass containing the hemicellulose sugars passes from the holding system 68 to a first high pressure screw press 74 for dewatering the biomass, and then to mixing and washing screw 76. A second high pressure screw press 78 is shown in FIG. 8, where it also functions as a feed screw 81 for the drying stage. This high pressure expression can take approximately one-and-a-half to three minutes.

Figure 6:
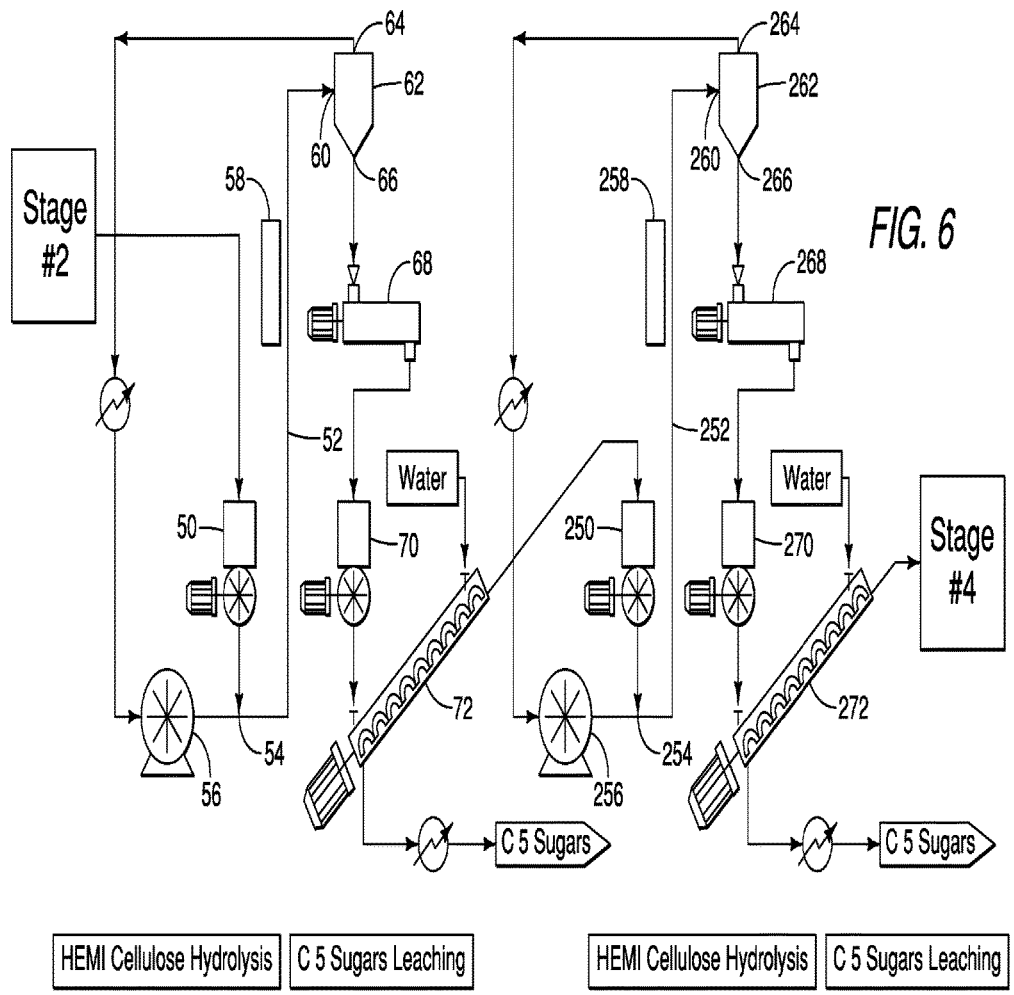
FIG. 6 is a schematic diagram of an alternative embodiment of a continuous flow steam loop reactor for hemicellulose hydrolysis and fractionation.

An alternative system for hemicellulose hydrolysis is shown in FIG. 6 having two hemicellulose reactors in series for stage one. The first hemicellulose reactor and hemicellulosic sugar leaching system are as described with regard to FIG. 4, although the reaction conditions (such as temperature, pressure and reaction time) may be modified such that hemicellulose hydrolysis is incomplete. The hydrolyzed hemicellulose products of the first hemicellulose reactor are leached out by the leaching system 72 and the residual solid including unhydrolyzed hemicellulose, cellulose and lignin are passed on to the second hemicellulose hydrolysis reactor. The residual solid is repressurized using a solids feed system such as a lock hopper/blow tank system. The second hemicellulose reactor includes the same components as the first hemicellulose reactor but may apply different reaction conditions. For example, the time, temperature, or pressure may be such that hemicellulose hydrolysis is complete. The hemicellulosic sugar product may be monomeric sugars, for example, and the residual solid may be cellulose and lignin with only a small hemicellulose component, such as less than 10%. In the embodiment shown, the second hemicellulose reactor includes a second solids feeder system 250, a second continuous steam loop 252 having an inlet 254 for entry of biomass and a blower 256 for circulating steam. EM/EA treatments may be applied by an EM/EA treatment generator 258. A second separator 262 includes an inlet 260, a first separator outlet 264 for steam to exit and a second separator outlet 266 to pass the biomass to a second holding system 268 and then to a second solids feeder system 270 and into a second hemicellulose sugar leaching system 272.

Figure 7:
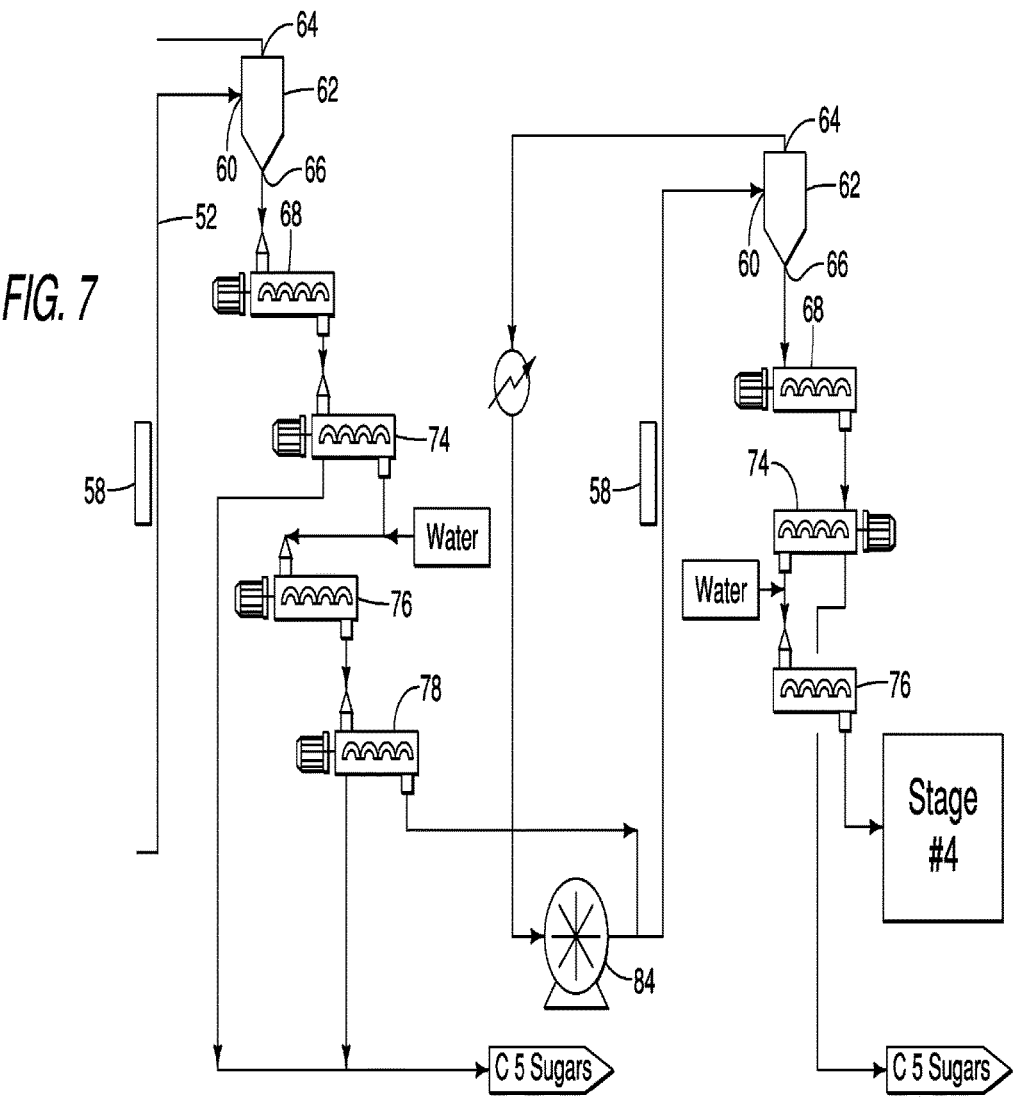
FIG. 7 is a schematic diagram of another alternative embodiment of a continuous flow steam loop reactor for hemicellulose hydrolysis and fractionation.

A further alternative embodiment is shown in FIG. 7. In this embodiment, like in FIG. 6, there are two hemicellulose reactor loops in series. In this embodiment, however, after exiting the holding system 68, the water including the hydrolyzed hemicellulose is removed using high pressure screw presses as in FIG. 5. A first high pressure screw press 74 dewaters the biomass, followed by a mixing and washing screw 76. A second high pressure screw press 78 is shown after the first hemicellulose reactor, while the second high pressure screw press 78 following the second hemicellulose reactor may be seen in FIG. 8, where it also functions as a feed screw 81 for the drying stage. As in FIG. 6, the biomass is repressurized before entering the second hemicellulose hydrolysis reactor by the high pressure screw press 78.

In some embodiments, the solid component remaining after removal of hemicellulosic sugars is further processed for removal of cellulosic sugars, such as by the processes described herein. In other embodiments, the solid component including cellulose and lignin and relatively free of hemicellulose, such as having less than 10% hemicellulose, may be used for other processes such as for the production of fiberboard. The cellulose and lignin solid may be combined with a traditional resin such as urea or formaldehyde. Alternatively, the hemicellulose obtained as described herein may be converted to a resin by separate chemical processing and combined with the cellulose and lignin solid to make fiberboard.

Cellulose Hydrolysis

In embodiments in which biofractionation is continued, the cellulose and lignin in the remaining solid are separated from each other next. This may be done by solvent solubilization of lignin, by enzymatic or acidic (dilute or concentrated) hydrolytic processes or by high temperature pyrolytic processes. In some embodiments, the cellulose biomass is subjected to flash thermolysis to break the cellulose lignin bonds, simultaneously hydrolyze the cellulose and vaporize the products of the hydrolysis.

After removal of the hemicellulose, such as by the process shown in FIGS. 3-7, the remaining solid biomass includes primarily cellulose and lignin. In many embodiments, on a dry basis, the remaining solid biomass is about 60-70% lignin and 30-40% cellulose, with small amounts of insolubles, such as inorganic salts. In some embodiments, the solid biomass is dewatered to remove loose surface water, as may be required for further processing. For example, the water may be removed by using a high pressure press. In some embodiments, the solid biomass has a water content of more than about 60%, such as about 60-75% before dewatering. After dewatering, the water content of the biomass may be reduced to less than about 60%, such as about 50 to 60%.

In some embodiments, the dewatered solid may then be dried using a superheated steam reactor (e.g., a loop, a tube, etc.). The dewatering process produces high pressure steam. This additional steam may be recovered to be used as energy, and the pressure used in the dewatering process may be determined based on the energy recovery requirements. This energy recovery may occur through direct use of the steam in another part of the fractionation process. In addition or alternatively, energy may be recovered after heat transfer to a clean fluid, such as through a pressure reducing turbo-generator to generate power. Systems which may be used for the step of drying the solid component of the biomass include continuous steam reactors such as conventional single or multi-tube reactors with or without static or rotating internals, screw conveyors or extruders, fluidized bed reactors such as bubbling, spouted, or circulating bed reactors, ablative reactors, and, in general, any single pass continuous system.

The use of a steam tube or loop for drying also allows the drying process to be continuous. Alternatively or additionally, in some embodiments, drying may be accomplished by direct contact with a hot, dry gas stream (such as combustion exhaust gases) or by a range of indirect, continuous drying systems, including belt and rotary dryers. The biomass may be dried to a water content of about 1 to 10%, and such as a water content of about 2 to 4%. In some embodiments, the drying process can take one to two minutes (including four to five seconds in the steam loop/tube).

In some embodiments, the remaining solid biomass is further processed to reduce its size. For example, the biomass may be chopped up into small pieces using an attritor or grinder to reduce the solid to a fine powder. In some embodiments, a size range of about 0.5 to 5 mm diameter may be used while in other embodiments a size range of about 2 to 3 mm diameter may be used. The size reduction is used in order to ensure that the particle rapidly attains the temperature at which thermolysis occurs, such as within about 0.5 to 3 seconds. Attriting the biomass may be used in embodiments in which the biomass will undergo flash thermolysis, for example. In embodiments in which cellulose thermolysis includes EM/EA treatments, drying and/or attriting of the biomass may be optional.

Flash thermolysis may then be performed by subjecting the biomass to a very highly superheated steam or inert gas, or a combination of steam and inert gas, optionally together with one or more of the EM/EA treatments. The EM/EA treatments may be employed to increase the heat transfer rate and to assist in breaking microcrystalline structures of the larger, more complex polymer molecules. In some embodiments, one or more of PEF, ultrasonic energy or microwave energy may be applied to the biomass immediately before it enters or as it passes through the cellulose reactor or any subsequent reactors. As such a portion of the reactor may include an EM/EA treatment generator to direct EM/EA treatment to the biomass prior to or as it passes through the reactor tube, for example. In some embodiments, microwave energy is applied, while in other embodiments ultrasonic energy is applied, within still other embodiments both microwave and ultrasonic energy are applied to the biomass in, or before, the same reactor. The microwave and ultrasound energy may be applied in either order, separately, in close proximity, consecutively or simultaneously. This combination of treatments may be particularly useful, as ultrasound energy may break up the cellulose crystals, while microwave energy may provide rapid heating. In some embodiments, the ultrasound energy may be applied at a frequency of 20 to 40 kHz or 200 kHz to 1 MHz and a duration 1 to 5 seconds or 30 to 90 seconds. The microwave energy may be applied at a frequency of 0.8 to 3 GHz and a duration of 1 to 10 seconds. In some embodiments, when EM/EA treatments are used in the cellulose hydrolysis step, the steps of drying and/or attriting the biomass prior to feeding it into the cellulose reactor may be omitted.

Flash thermolysis may be performed using a continuous process, such as by feeding the biomass into a continuous steam reactor. In some embodiments, the reactor includes only steam as the carrier gas. In other embodiments, steam is used in combination with an inert gas to hydrolyze and carry the biomass. Examples of inert gases which may be used include $CO_2$, CO, nitrogen, hydrogen, or combinations thereof. Certain carrier gases may result in reactions which favor the production of certain cellulose products. As such, the carrier gas or gases may be selected and used according to the desired products. For example, the use of hydrogen as a carrier gas can result in the production of less oxygenated bio oils.

In some embodiments, the superheated steam and/or gas may be applied to the biomass at a temperature of between about 350 and about 550 degrees Celsius. In some embodiments, the superheated steam and/or gas may be applied to the biomass at a temperature between about 400 and about 450 degrees Celsius. Actual temperatures are dependent on the feedstock and the desired products. In some embodiments, the superheated steam and/or gas may be applied to the biomass at a pressure of between about 0 bara and about 4 bara, such as a pressure of between about 1 bara and about 2 bara, depending on pressure losses in the system. By using the appropriate temperature and residence time, the bond between lignin and cellulose is broken and the cellulose is hydrolyzed by the steam into C6 sugars and other volatile compounds which are vaporized. The solid which remains after vaporization of the cellulose consists of a lignin char. In some embodiments, the presence of steam and the use of a temperature that is sufficiently low may be selected to substantially avoid pyrolysis of the biomass, which would cause the cellulose to form a much larger proportion of various hydrocarbons such as tars, oils and gases. Therefore, in such embodiments, the temperature of the thermolysis reaction must be high enough for hydrolysis but not too high or else the cellulose will pyrolyze and the chemical composition of the products will be greatly altered. In some embodiments, thermolysis can take approximately 30 seconds to one minute (including one-half to five seconds in the reactor).

In other embodiments, cellulose thermolysis may be performed using two or more continuous superheated steam and/or gas reactors. The reaction conditions of the first cellulose reactor, including temperature, pressure, reaction time, and carrier gas, may be selected such that the cellulose hydrolysis reaction favors production of one or more first cellulosic products. For example, the first cellulose reactor may produce cellulose oligomers or an higher proportion of a specific C-6 sugar. The second cellulose reactor and any subsequent cellulose reactors may have different reaction conditions, such as to complete cellulose hydrolysis. In such embodiments, the second reactor may be considered a second cellulose hydrolysis reactor. For example, the first cellulose reactor may be at a temperature of 350-500° C. while the second cellulose reactor may be at a temperature of 450-550° C., with the temperature in the first reactor being less than in the second reactor. In other embodiments, the second reactor may provide conditions to pyrolyze lignin, in which case the second reactor may comprise a lignin pyrolysis reactor. This may follow complete hydrolysis of the cellulose. For example, the first reactor may hydrolyze cellulose at a temperature of about 350-550° C. and the second reactor may pyrolyze lignin at a temperature of 450-650° C., with the temperature of the first reactor less than the second reactor. In still other embodiments, the cellulose hydrolysis may be performed partially by a first cellulose hydrolysis reactor to produce a first cellulosic sugar product and then cellulose hydrolysis may be completed by a second cellulose hydrolysis reactor. A third reactor (a lignin pyrolysis reactor) may then pyrolyze the lignin. In such embodiments, the first reactor may be at a temperature of 350-500° C., the second reactor may be at a temperature of 400-550° C., and the third reactor may be at a temperature of about 450-650° C., with the temperature in the first reactor being less than the second reactor and the temperature in the second reactor being less than the third reactor.

In some embodiments, the final reactor may treat the remaining lignin fraction after removal of cellulose by one or more cellulose reactors to gasify the lignin. Such a reactor may be a continuous steam reactor like those used for cellulose thermolysis, but may apply a higher temperature such as about 900-1200° C. to produce hydrogen and carbon monoxide which may be used for chemical conversion processes.

The vaporized C6 sugars and volatiles may next be separated from the remaining biomass and collected. In some embodiments, the remaining biomass (such as lignin char) and vapors are passed into a separator for separating vapors from solids, such as a cyclonic separator, which may be in line within the steam loop/tube. The separated vapor includes the hydrolyzed cellulosic vapors, which can then be condensed, such as by a direct contact condenser, scrubber, or similar apparatus. These vapors also contain significant heat energy, which may be recovered. The cellulosic sugars may then be extracted from the condensed liquid, such as by any of the technologies listed earlier for hemicellulose products. The separated cellulosic sugars may include glucose, levoglucosan, and levulinic acid, for example. The cellulosic sugars and the other products collected may then be used for various commercial purposes or for further processing, such as fermentation to produce alcohols, either in conjunction with the fractionation process or separately. Other downstream technologies which can utilize the primary products of this fractionation process include Virent's Aqueous Phase Reforming process (for synthetic gasoline, jetfuel and diesel); Segetis Binary Monomer technologies; and other catalytic conversion processes and chemical or biochemical reaction processes.

The solid that remains after hydrolysis of the cellulose is a lignin char. The lignin char may be further processed. For example, the lignin may be chemically converted into other products, such as phenols, soluble lignosulphonates and, more generally, into a range of aromatic, cyclic and aliphatic feedstocks. Alternatively, some types of lignin may be pyrolyzed to produce phenols for synthetic resins. In some embodiments, the lignin may be fed into a reactor like the cellulose reactor, as a final reactor. This lignin reactor may be used to pyrolyze the lignin to produce phenolic products, for example. In other embodiments, the lignin may be burned to produce energy, such as for the operation of the fractionation system. In still other embodiments, the lignin may be gasified to produce hydrogen and syngas, with the hydrogen finding use in reduction reactions of some of the other primary products.

Thermolysis and pyrolysis may be carried out in simple, entrained flow tube reactors or fluidized bed reactors. Examples of fluidized bed reactor which may be used include bubbling fluidized bed or a circulating fluidized bed, or in special reactors, such as a rotating cone reactor or other ablative type reactor. In embodiments which include a lignin gasification reactor, the reactor may be any of the above reactors used for thermolysis or pyrolysis, or may be an up draft or down draft fixed bed reactor, for example.

Fluidised bed reactors generally require an inert medium and heat the biomass through contact with the pre-heated particulate medium. The inert medium may also have some catalytic activity. The biomass is introduced into the inert bed, which is fluidized by a hot gas stream passing up through it.

An embodiment of a system and process for cellulose hydrolysis and fractionation is shown in FIG. 8. Following hemicellulose hydrolysis, such as by the system shown in FIGS. 3-7, the biomass may be prepared for flash thermolysis by drying the biomass. The biomass is passed through the final dewatering high pressure screw press 78 which also functions as a feed screw, for example, and into a superheated steam loop 80 through a steam loop inlet 82 for superheated steam drying the biomass. The superheated steam loop 80 includes a blower 84 which causes the steam and the entrained biomass to circulate through the steam loop 80 to the separator 86, such as a cyclonic separator, which separates the steam from the biomass. The separator includes an inlet 88, a first outlet 90 through which the steam exits to recirculate in the steam loop 80, and a second outlet 92 through which the dried biomass exits. After exiting the separator, the biomass may pass onto the grinding system 94. From the grinding system 94, the biomass passes into a solids feeding system 96, like those described above, and then into the steam reactor 100 through the steam reactor inlet 102 for the separation of the cellulose from the lignin, the hydrolysis of the cellulose into vapors of C6 sugars and other volatiles, and the formation of lignin char within the steam reactor 100. The thermolysis reactor may also optionally contain one or more of the EM/EA treatment generator 103. The cellulose vapors and lignin char pass through the steam reactor 100 to a separator 104, such as a cyclonic separator, in which the C6 sugar and other volatiles vapors are separated from the lignin char. The separator includes an inlet 106, a first outlet 108 through which the separated C6 sugar vapors and steam exit the separator, and a second outlet 110 through which the lignin char exits the separator.

Figure 9:
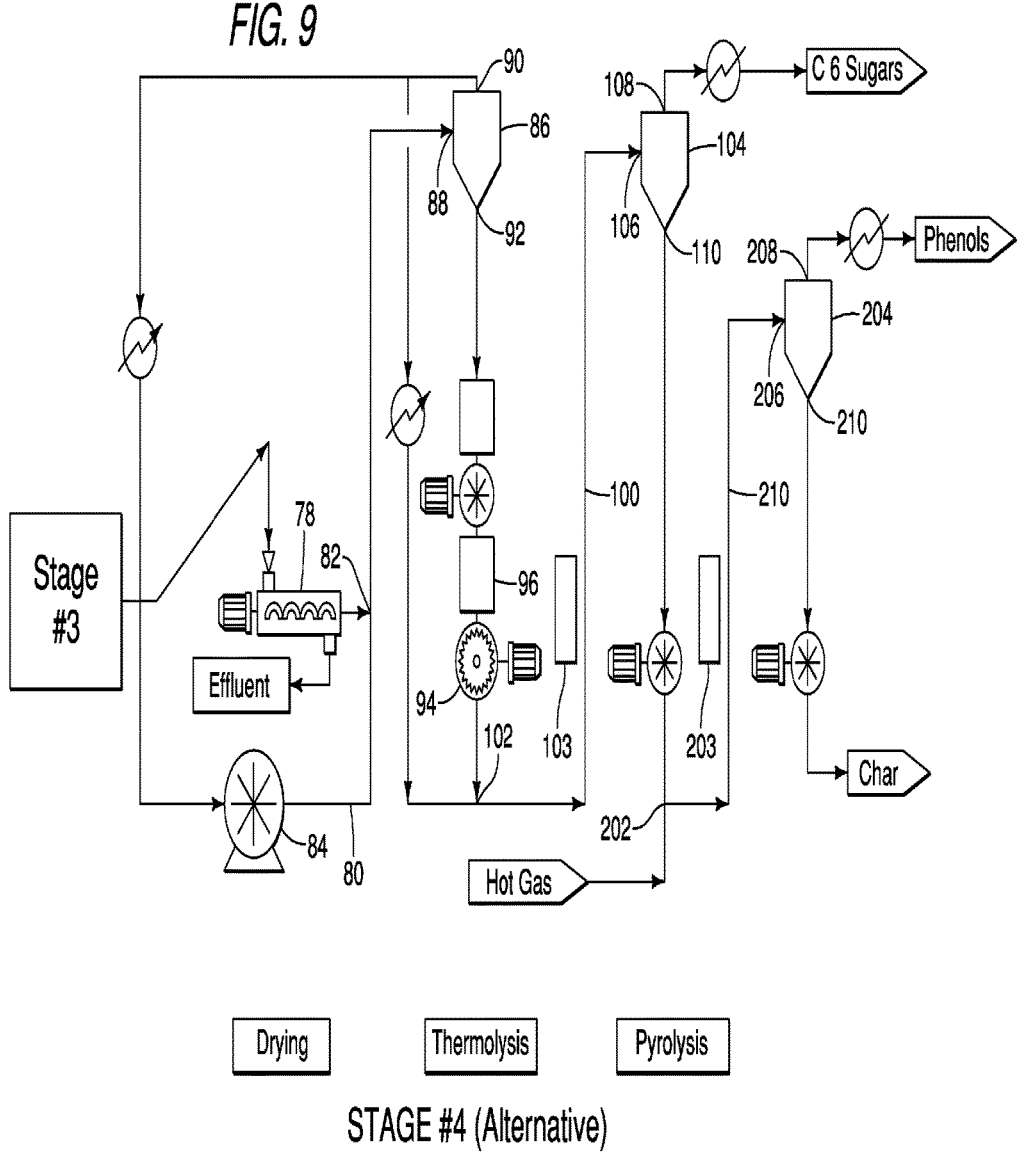
FIG. 9 is a schematic diagram of an alternative continuous flow thermolysis system for the hydrolysis of cellulose and the fractionation of cellulose and lignin.

An alternative embodiment is shown in FIG. 9. As in FIG. 8, the biomass first may pass through a superheated steam loop 80 for drying and a grinding system 94. The solid material including cellulose and lignin then passes into a first steam reactor 100 for cellulose hydrolysis and then through the separator into a second steam reactor 200. The conditions of the first steam reactor 100 may only partially hydrolyze the cellulose, in which case the first steam reactor 100 is a first cellulose hydrolysis reactor and the second steam reactor 200 may be a second cellulose hydrolysis reactor which completes cellulose hydrolysis. Alternatively, the first steam reactor 100 may complete cellulose hydrolysis such that the remaining solid is comprised of only lignin, in which case the second steam reactor 200 may be a lignin reactor for pyrolysis of lignin. The resulting product of the second reactor may be separated by a separator 110, into phenols and char.

In FIG. 9, the second steam reactor 200 is a superheated steam tube like the first steam reactor 100. The remaining biomass passes from the first separator 104 and into the second steam reactor 200. The second steam reactor 200 includes an inlet 202 and an outlet 206 through which the remaining biomass passes to a second separator 204. The second separator includes a first outlet 208 and a second outlet 210. In the embodiment shown, the first steam reactor 100 completely hydrolyzes the cellulose and the second steam reactor 200 pyrolyzes lignin to produce phenols. The phenols exit the separator as vapor through the first outlet 208 while the remaining lignin char exits the separator through the second outlet 210. In alternative embodiments, or under alternative conditions, the first steam reactor 100 may incompletely hydrolyze the cellulose and the second steam reactor may complete cellulose hydrolysis with the cellulosic products exiting the second separator 204 as vapor through the first outlet 208 and the lignin char existing through the second outlet 210.

In some embodiments, the biofractionation may include a branch after removal of hemicellulosic sugars and before the remaining cellulose and lignin solid proceeds to cellulose thermolysis. At this branch, a side stream of cellulose and lignin solid may be diverted for separate processing. For example, the side stream may subject the solid to chemical treatment to separate the cellulose and lignin. For example, a standard wood pulp treatment, such as the sulphite process (using salts of sulfurous acid such as sulfites or bisulfites) or the kraft process (using sodium hydroxide and sodium sulfate) or the National Renewable Energy Laboratory (NREL) Clean Fractionation process (using methyl isobutyl ketone) may be used to dissolve lignin. The resulting cellulose pulp may then be obtained as a product which may be used for paper production or cellulosic chemicals and fibers. Such an optional side stream provides additional flexibility to the system.

The various systems and processes shown in FIGS. 1-9 may be used individually, in combination with various other fractionation systems, or may be used together in various combinations. When used together, the systems and processes shown in FIGS. 1-9 may be used to form an embodiment of a continuous flow fractionation system for the separation of non-carbohydrates (lipids, proteins, etc.), hemicellulose, cellulose and lignin from a lignocellulosic biomass material in which the biomass flows continuously through the entire system. The continuous system separates the lignocellulosic material into four or more separate fractions, individually isolating the non-carbohydrates, hemicellulose sugars, cellulose sugars and lignin.

Figure 10:
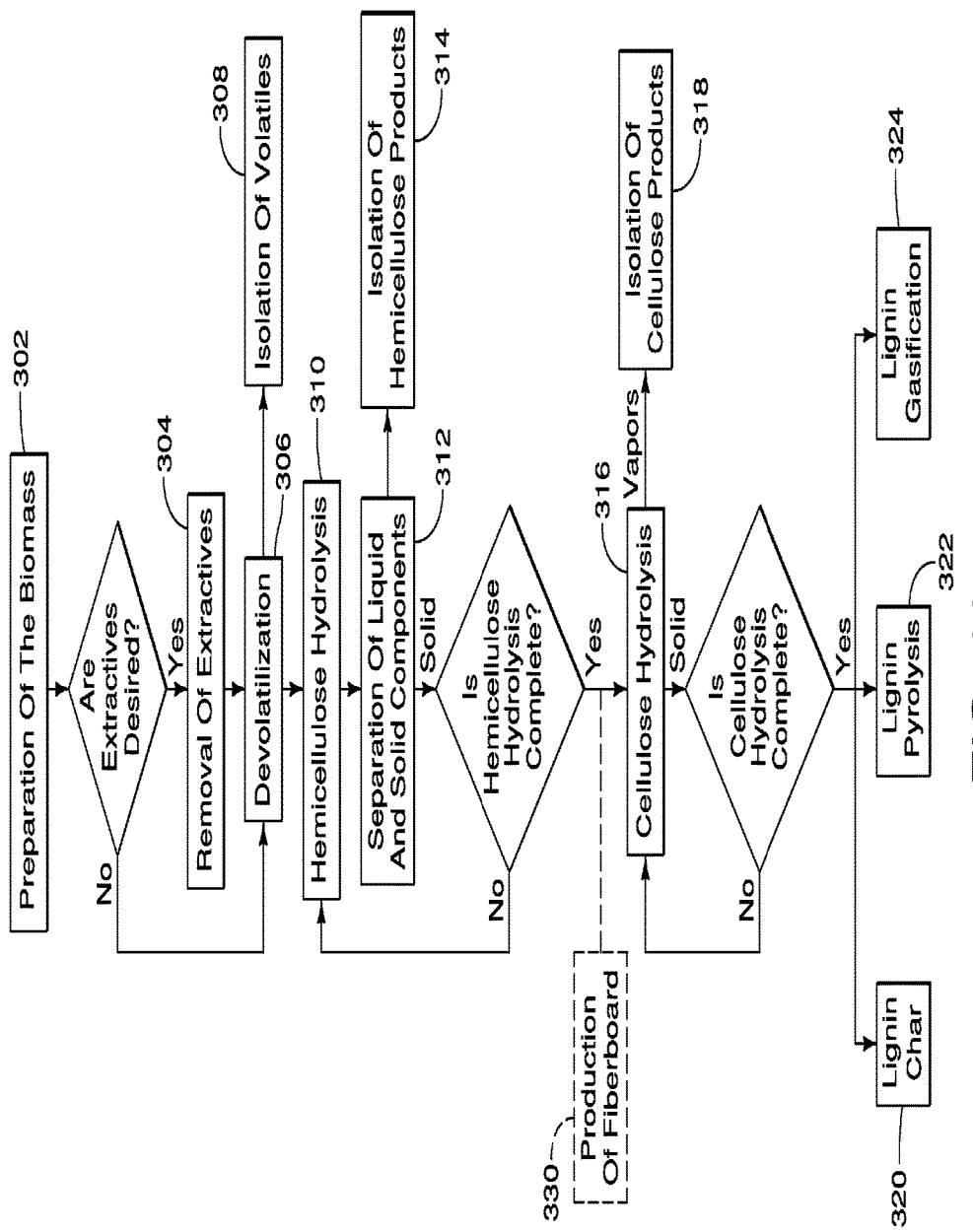
FIG. 10 is a flow chart of a biomass fractionation process.

A flowchart showing an example of how the process may be used to fully fractionate lignocellulosic biomass is depicted in FIG. 10. A single system may be created by which the various options may be included and by which they may be bypassed as desired. In this way, the system provides a high degree of flexibility, able to accommodate any feedstock and to be adjusted to produce desired fractionation products. As shown in the example of FIG. 10, the first step of is preparation of the biomass 302. This step may or may not be necessary, depending upon the nature of and source of the biomass. If extractives are desired, the next step is to removal of the extractives 304. If no extractives are desired, this step can be omitted or bypassed. The biomass then passes to the next step, which is devolatilization 306. The volatiles released during this step may be isolated in the step of isolating the volatiles 308. The biomass next proceeds to the steps of hemicellulose hydrolysis 310 and separation of the liquid and solid components 312. The liquid component may then proceed to the step of isolation of the hemicellulosic products 314. If hemicellulose hydrolysis is not complete, the solid may proceed through the steps of hemicellulose hydrolysis 310 and separation of the liquid and solid components 312 again, though this will occur in a second hemicellulose reactor and may use different reaction conditions such as increased time and/or temperature. When hemicellulose hydrolysis is complete, the solid biomass passes to the step of cellulose hydrolysis 316. The vapors produced by cellulose hydrolysis are isolated in the step of isolation of cellulosic products 318. If cellulose hydrolysis is incomplete, the remaining biomass may repeat the step of cellulose hydrolysis, though the process will occur in a second cellulose hydrolysis reactor and may use different reaction conditions such as increased time and/or temperature. If the cellulose hydrolysis is complete, the resulting lignin char 320 may be obtained as a final product, or it may proceed to the step of lignin pyrolysis 322 or lignin gasification 324. In an alternative embodiment, after completion of hemicellulose hydrolysis 310, the solid component may be used for production of fiberboard 330.

Heat may be supplied to the various reactors using a variety of means. For example, hot oil may be used as in conventional heating systems, with the reactors having hot oil jackets. In some embodiments, induction may be used for heating the steam and/or heating the biomass. In other embodiments, infrared energy may be used for heating.

Various approximate residence times have been provided herein. In some embodiments, the entire process of fractionating pretreated biomass is between four-and-a-half and eleven-and-a-half minutes. In embodiments that employ a low-pressure process to separate hydrolyzed hemicellulose from lignin-cellulose solid in the hydrolysis stage, pretreated biomass can be fractionated in approximately seven-and-a-half to eleven-and-a-half minutes, and raw biomass can be fully pretreated (including oil extraction) and fractionated in approximately fourteen-and-a-half to twenty-one minutes. In embodiments that employ a high-pressure process to separate hydrolyzed hemicellulose from lignin-cellulose solid in the hydrolysis stage, pretreated biomass can be fractionated in approximately four-and-a-half to nine minutes, and raw biomass can be fully pretreated (including oil extraction) and fractionated in approximately eleven-and-a-half to eighteen-and-a-half minutes.

In the foregoing detailed description, the invention has been described with reference to specific embodiments. However, it may be appreciated that various modifications and changes can be made without departing from the scope of the invention. Thus, some of the features of preferred embodiments described herein are not necessarily included in preferred embodiments of the invention which are intended for alternative uses.

I claim:

1. A method of fractionating lignocellulosic biomass material comprising:
    feeding the biomass into a devolatilization reactor to remove volatile components of the biomass and obtain a prepared biomass;
    feeding the prepared biomass into a hemicellulose hydrolysis reactor to separate and hydrolyze hemicellulose;
    separating the biomass into a first solid component and a liquid component, wherein the liquid component includes hydrolyzed hemicellulose in water or solvent and wherein the first solid component includes cellulose and lignin and has less than about 10% hemicellulose;

feeding the first solid component into a cellulose hydrolysis reactor comprising a continuous superheated steam reactor to hydrolyze and vaporize the cellulose component; and condensing the vaporized cellulose.

2. The method of claim 1 wherein the cellulose hydrolysis reactor applies steam to the biomass at a temperature of at least 300° C.

3. The method of claim 1 wherein the cellulose hydrolysis reactor applies steam to the biomass at a temperature of between about 400 and 550° C.

4. The method of claim 1 wherein the cellulose hydrolysis reactor applies pressure to the biomass of 1-3 bara.

5. The method of claim 1 wherein the cellulose hydrolysis reactor applies steam to the biomass at a temperature of between about 400 and 550° C. and at a pressure of 1-3 bara.

6. The method of claim 1 wherein the cellulose hydrolysis reactor applies a mixture of steam and a gas to the first solid component.

7. The method of claim 1 wherein the gas comprises nitrogen, hydrogen, carbon dioxide, carbon monoxide, or combinations thereof.

8. The method of claim 1 further comprising applying electromagnetic or electroacoustic (EM/EA) treatment to the biomass.

9. The method claim 8 wherein the EM/EA treatment includes Pulsed Electric Field, ultrasonic energy, microwave energy, and combinations thereof.

10. The method of claim 1 further comprising applying ultrasonic energy to the biomass within the cellulose hydrolysis reactor.

11. The method of claim 1 further comprising applying microwave energy to the biomass within the cellulose hydrolysis reactor.

12. The method of claim 1 further comprising applying ultrasonic and microwave energy to the biomass within the cellulose hydrolysis reactor.

13. The method of claim 1 further comprising feeding the first solid component into a dryer comprising a continuous superheated steam reactor after separating the biomass in the hemicellulose hydrolysis reactor to reduce the water content of the first solid component before feeding the first solid component into the cellulose hydrolysis reactor.

14. The method of claim 1 further comprising attriting the first solid component after separating the biomass in the hemicellulose hydrolysis reactor and before feeding the first solid component into the cellulose hydrolysis reactor.

15. The method of claim 1 wherein the cellulose hydrolysis reactor produces a cellulose vapor and lignin char.

16. The method of claim 1 wherein the cellulose hydrolysis reactor hydrolyzes cellulose and produces a cellulosic sugar vapor and a second solid component.

17. The method of claim 16 further comprising feeding the second solid component into a second cellulose hydrolysis reactor comprising a superheated steam reactor.

18. The method of claim 17 wherein the first cellulose reactor partially hydrolyzes the cellulose and the second cellulose hydrolysis reactor completes cellulose hydrolysis and separates the vaporized cellulose from the lignin.

19. The method of claim 16 further comprising feeding the second solid component into a superheated steam reactor to reduce lignin to a condensable vapor.

* * * * *